(12) United States Patent
Fujimoto et al.

(10) Patent No.: US 9,800,757 B2
(45) Date of Patent: Oct. 24, 2017

(54) PRINT SYSTEM

(71) Applicant: FUJI XEROX CO., LTD., Tokyo (JP)

(72) Inventors: Hideki Fujimoto, Kanagawa (JP);
Tetsuya Kobayashi, Kanagawa (JP);
Mariko Miyazaki, Kanagawa (JP);
Kunitoshi Yamamoto, Kanagawa (JP);
Hajime Kajiyama, Kanagawa (JP);
Naoya Ogata, Kanagawa (JP); Akira Ichikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/249,969

(22) Filed: Aug. 29, 2016

(65) Prior Publication Data

US 2017/0280008 A1 Sep. 28, 2017

(30) Foreign Application Priority Data

Mar. 28, 2016 (JP) ................. 2016-063096

(51) Int. Cl.
*H04N 1/32* (2006.01)
*H04N 1/00* (2006.01)

(52) U.S. Cl.
CPC ..... *H04N 1/32545* (2013.01); *H04N 1/00344* (2013.01); *H04N 1/00347* (2013.01); *H04N 1/32507* (2013.01); *H04N 1/32523* (2013.01); *H04N 2201/0094* (2013.01); *H04N 2201/3222* (2013.01)

(58) Field of Classification Search
CPC ........... H04N 1/32545; H04N 1/32523; H04N 2201/0094

See application file for complete search history.

(56) References Cited

U.S. PATENT DOCUMENTS

| 9,348,337 | B2* | 5/2016 | Chen | A61B 6/102 |
| 2006/0058921 | A1* | 3/2006 | Okamoto | G05D 1/0214 |
| | | | | 700/255 |
| 2008/0297830 | A1* | 12/2008 | Sewell | H04N 1/00278 |
| | | | | 358/1.15 |
| 2009/0043502 | A1* | 2/2009 | Shaffer | G01C 21/20 |
| | | | | 701/469 |
| 2010/0023252 | A1* | 1/2010 | Mays | G01C 21/20 |
| | | | | 701/533 |
| 2011/0178668 | A1* | 7/2011 | Tanaka | G09B 29/106 |
| | | | | 701/25 |

(Continued)

FOREIGN PATENT DOCUMENTS

| JP | 2001-125646 A | 5/2001 |
| JP | 2003-110779 A | 4/2003 |

*Primary Examiner* — Ted Barnes
(74) *Attorney, Agent, or Firm* — Oliff PLC

(57) ABSTRACT

A print system includes a client device, plural mobile printers, and a server device. The client device issues a print instruction in accordance with a user operation. The plural mobile printers each receive a print instruction and move to a destination indicated by the print instruction so as to perform printing at the destination. The server device selects a mobile printer which will perform printing based on a print instruction issued by the client device, in accordance with selection standards including judgement standards for judging whether or not it is necessary to distribute a print instruction over plural mobile printers or to transfer a print instruction from one mobile printer to another mobile printer.

7 Claims, 36 Drawing Sheets

(56) References Cited

U.S. PATENT DOCUMENTS

| | | | |
|---|---|---|---|
| 2013/0116880 A1* | 5/2013 | Shitamoto | G05D 1/0236 701/25 |
| 2013/0190963 A1* | 7/2013 | Kuss | B66F 9/063 701/23 |
| 2014/0309835 A1* | 10/2014 | Yamamoto | G05D 1/0217 701/25 |
| 2014/0365060 A1* | 12/2014 | Yamamoto | G05D 1/02 701/23 |
| 2015/0378652 A1* | 12/2015 | Sakurai | H04N 1/00307 358/1.15 |

* cited by examiner

| THE NUMBER OF PRINT PAGES | ROBOT TO BE ASSIGNED |
|---|---|
| SMALLER THAN N1 | ONE SMALL ROBOT |
| N1 - N2 | ONE LARGE ROBOT OR TWO SMALL ROBOTS |
| N2 - N3 | ONE LARGE ROBOT AND ONE SMALL ROBOT |
| GREATER THAN N3 | ONE LARGE ROBOT AND TWO SMALL ROBOTS |

Printing will start very soon.
Please go to the multifunction device right now.

OK

PRINT SYSTEM

CROSS-REFERENCE TO RELATED APPLICATIONS

This application is based on and claims priority under 35 USC 119 from Japanese Patent Application No. 2016-063096 filed Mar. 28, 2016.

BACKGROUND (i) Technical Field
The present invention relates to a print system.
(ii) Related Art
A mobile printer which moves around by itself in a predetermined space, such as an office, and performs printing at a destination has been suggested.

SUMMARY

According to an aspect of the invention, there is provided a print system including a client device, plural mobile printers, and a server device. The client device issues a print instruction in accordance with a user operation. The plural mobile printers each receive a print instruction and move to a destination indicated by the print instruction so as to perform printing at the destination. The server device selects a mobile printer which will perform printing based on a print instruction issued by the client device, in accordance with selection standards including judgement standards for judging whether or not it is necessary to distribute a print instruction over plural mobile printers or to transfer a print instruction from one mobile printer to another mobile printer.

BRIEF DESCRIPTION OF THE DRAWINGS

An exemplary embodiment of the present invention will be described in detail based on the following figures, wherein.

DETAILED DESCRIPTION

An exemplary embodiment of the invention will be described below.

(System Configuration)

Figure 1:
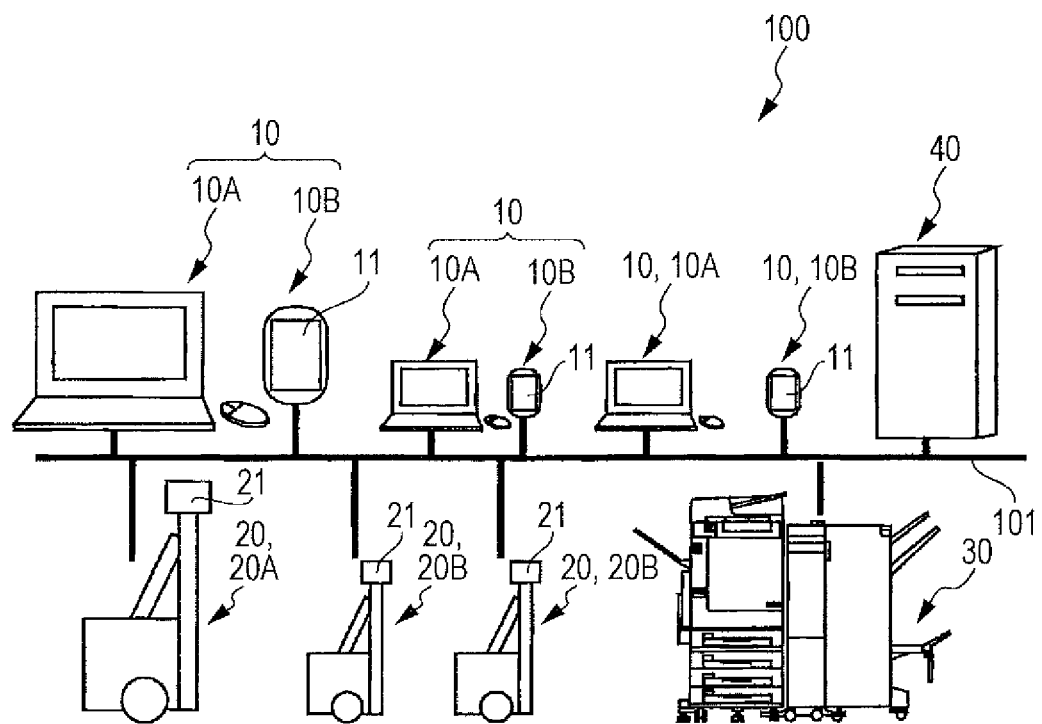
FIG. 1 is a schematic view illustrating the overall configuration of a print system according to an exemplary embodiment of the invention.

FIG. 1 is a schematic view illustrating the overall configuration of a print system 100 according to an exemplary embodiment of the invention.

The print system 100 includes self-mobile printers 20. In the print system 100, in response to a print instruction from a user, a self-mobile printer 20 goes to the location of this user, conducts user authentication, and then performs printing.

The print system 100 includes plural notebook personal computers (hereinafter simply referred to as "notebook PCs") 10A and mobile terminal devices (hereinafter simply referred to as "mobile terminals") 10B. The notebook PCs 10A and the mobile terminals 10B each form a client device 10 on its own, or a notebook PC 10A and a mobile terminal 10B synchronized with each other by the same user as a pair form a client device 10. A user may input a print instruction by using a certain client device 10. Each mobile terminal 10B includes a touch-panel display screen 11, and a user touches the display screen 11 with a finger so as to input an instruction into the mobile terminal 10B.

In the example shown in FIG. 1, the print system 100 includes three self-mobile printers 20. The self-mobile printer 20 corresponds to a mobile printer according to an exemplary embodiment of the invention. Each self-mobile printer 20 includes an IC card reader (not shown), and receives a print instruction from a user, moves to the desk of this user, conducts user authentication by using an IC card, and then performs printing.

Each self-mobile printer 20 includes a camera 21, and is capable of moving with the camera 21 facing its moving direction while avoiding obstacles ahead by constantly monitoring and judging whether or not it can pass through a certain space on its way to a user.

Among the three self-mobile printers 20 included in the print system 100, a self-mobile printer 20A has a faster print speed than the other two self-mobile printers 20B and is suitable for printing relatively in large quantities. However, the size of the self-mobile printer 20A is larger than the other two self-mobile printers 20B. Although the self-mobile printer 20A can move by itself, it can only pass through relatively wide spaces. Accordingly, the self-mobile printer 20A is not a handy type. On the other hand, the other two self-mobile printers 20B are small printers and are capable of passing through relatively narrow spaces, unlike the self-mobile printer 20A. However, the print speed of the self-mobile printers 20B is slow, and they are not suitable for printing in large quantities, but for printing in small quantities. The three self-mobile printers 20 store only A4-size sheets therein and are not capable of printing on another size of sheet. The three self-mobile printers 20 do not have post-processing functions, such as punching and stapling functions.

The print system 100 also includes a stationary multifunction device 30. The multifunction device 30 has multiple functions, such as a scanner function and a copy function, in addition to a print function. The print speed of the multifunction device 30 is even faster than that of the above-described large self-mobile printer 20A. The multifunction device 30 stores a large number of sheets and is more suitable for printing in larger quantities than the large self-mobile printer 20A. Additionally, the multifunction device 30 stores various sizes of sheets in addition to A4-size sheets and has post-processing functions. That is, the multifunction device 30 is designed to be able to satisfy various requests from users. The multifunction device 30 corresponds to an example of a stationary printer according to an exemplary embodiment of the invention. The multifunction device 30 also includes an IC card reader (not shown). When performing printing by using the multifunction device 30, the user is required to pass the user's IC card over the IC card reader so as to cause the multifunction device 30 to conduct user authentication. In this exemplary embodiment, however, the self-mobile printer 20 may conduct user authentication on behalf of the multifunction device 30, which will be discussed later.

The print system 100 also includes a server device 40. The server device 40 receives a print instruction from each client device 10, assigns the print instruction to one of the three self-mobile printers 20 or the multifunction device 30, and transfers a file to be printed to the assigned self-mobile printer 20 or multifunction device 30. If the print instruction is assigned to a self-mobile printer 20, the server device 40 specifies a destination (location) where the self-mobile printer 20 is supposed to go and instructs it to go to this destination and perform printing.

The server device 40 constantly monitors the up-to-date congestion state of the multifunction device 30. More specifically, the server device 40 constantly monitors a queue of print instructions (jobs) of the multifunction device 30, estimates the time taken to execute processing of each job in the queue, and detects which job will start at what time. If a new print instruction (job) is received, the server device 40 detects at what time the processing of this job will start. The server device 40 also constantly monitors the up-to-date state of each self-mobile printer 20. That is, the server device 40 monitors which self-mobile printer 20 is currently located where and is executing which job, or whether or not they are in the standby state. The server device 40 also constantly monitors a queue of print instructions (jobs) of each self-mobile printer 20, estimates the time taken to execute processing of each job in the queue, and detects which job will start at what time. If a new print instruction (job) is received, the server device 40 detects at what time the processing of this job will start.

The client devices 10, the self-mobile printers 20, the multifunction device 30, and the server device 40 shown in FIG. 1 are connected to one another by a wireless local area network (LAN) 101 so that they can communicate with one another.

The client devices 10, the self-mobile printers 20, the multifunction device 30, and the server device 40 shown in FIG. 1 each have a processor function of executing programs, and execute processing or operation in accordance with a program.

The print system 100 shown in FIG. 1 is located, for example, in an office having the following layout.

(Office Layout)

Figure 2:
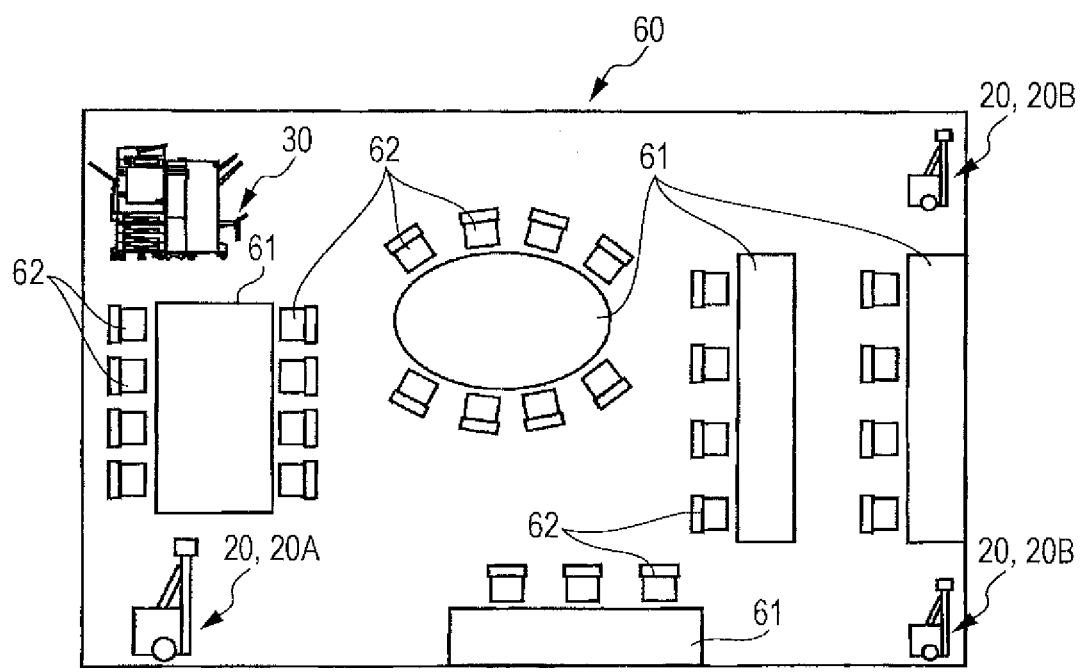
FIG. 2 is a schematic view illustrating the layout of an office.

FIG. 2 is a schematic view illustrating the layout of an office 60.

In the office 60, plural tables 61 and plural chairs 62 are disposed. A unique seat number is assigned to each chair 62.

In the office 60, the three self-mobile printers 20 shown in FIG. 1 are located. The positions of the self-mobile printers 20 shown in FIG. 2 are their standby positions in the office 60. A recharging facility (not shown) is equipped in each of the standby positions. When the self-mobile printers 20 return to the standby positions, they are charged by the recharging facilities, and are able to move and perform printing by the charged energy.

The multifunction device 30 shown in FIG. 1 is also installed in the office 60.

In the server device 40 (not shown in FIG. 2), the layout of the entire office 60, such as the arrangement of the tables 61 and the chairs 62, the widths of spaces, and the position of the multifunction device 30 in the office 60, is stored as data. If necessary, the data or an instruction based on the data is sent to a self-mobile printer 20 from the server device 40.

In this exemplary embodiment, this office 60 employs the following system. Even though a user is authorized to use the office 60, a specific seat (chair 62) is not assigned to the user. Each user simply takes an available seat (chair 62) when entered the office 60 and does their work. When entering the office 60, each user follows certain procedures at the entrance (not shown) of the office 60, and a user ID which is valid only on that day is given to each user. The user receives an IC card having the user ID recorded thereon and enters the office 60. This user ID is, not only recorded on the IC card, but also sent to the server device 40 (see FIG. 1) and is registered in association with the user. The user carries the IC card and returns it when leaving the office 60.

In the print system 100 installed in the office 60, when the user starts working and gives a print instruction by operating the user's client device 10 (notebook PC 10A or mobile terminal 10B), unless the multifunction device 30 performs printing, the self-mobile printer 20 comes to the user's seat, conducts user authentication, and then performs printing. If the multifunction device 30 performs printing, the user is required to go to the location at which the multifunction device 30 is installed.

(Login)

Figure 3:
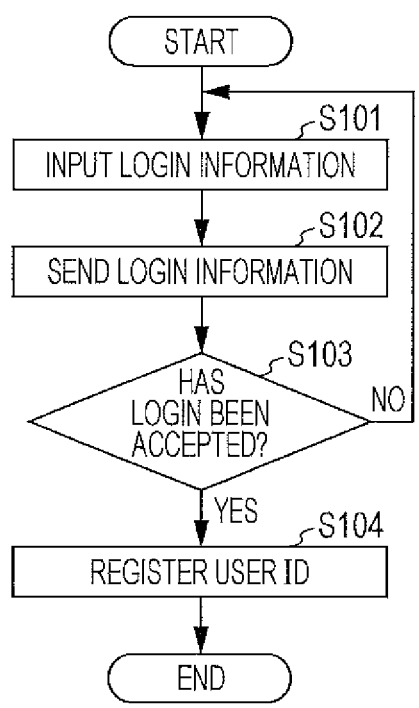
FIG. 3 is a flowchart illustrating processing executed by a client device when performing a login operation.

FIG. 3 is a flowchart illustrating processing executed by the client device 10 when performing a login operation.

Figure 4:
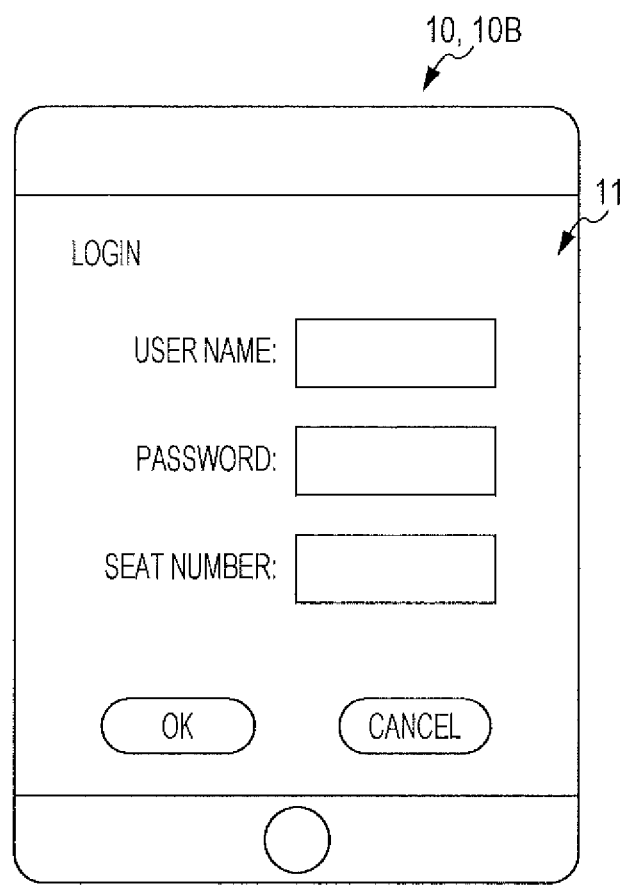
FIG. 4 illustrates a login screen.

FIG. 4 illustrates a login screen.

In this exemplary embodiment, a description will be given, assuming that the mobile terminal 10B is used as the client device 10. It is obvious that the user may use the notebook PC 10A and that the user may selectively use both of the notebook PC 10A and the mobile terminal 10B depending on the situation. Accordingly, attention is not particularly paid to the difference in the operations between the notebook PC 10A and the mobile terminal 10B.

After going through the certain procedures at the entrance, the user enters the office 60 shown in FIG. 2 and takes one of the available seats (chairs 62) in the office 60. Then, the user operates the client device 10 and performs a login operation to start using the print system 100 installed in the office 60.

Before performing the login operation, the user first starts an application program for using the print system 100. Then, the login screen shown in FIG. 4 is displayed on the display screen 11 of the client device 10 (in this case, the mobile terminal 10B).

In step S101 of FIG. 3, the user name, password, and seat number are input on the login screen shown in FIG. 4 by a user operation. Then, in step S102, when the user presses the OK button on the login screen, information concerning the user name, password, and seat number is sent to the server device 40 (see FIG. 1). Then, if a message indicating that the login operation has been accepted is received from the server device 40 in step S103, a user ID received together with this message is registered in the client device 10 in step S104. Then, the login operation has been completed. If a message indicating that the login operation has been rejected is received from the server device 40 in step S103, information is input again on the login screen shown in FIG. 4 in step S101.

Figure 5:
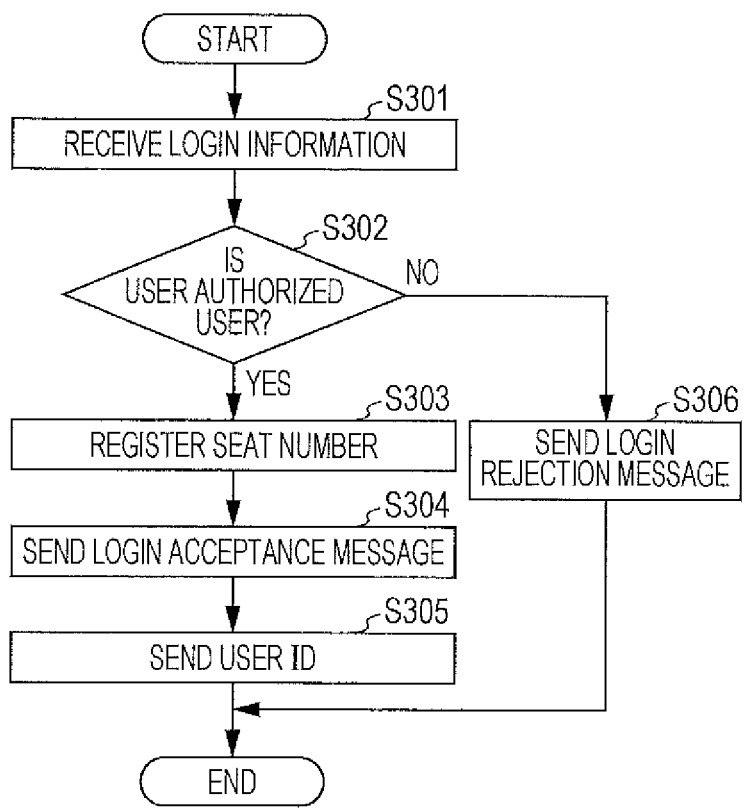
FIG. 5 is a flowchart illustrating processing executed by a server device when receiving login information from a client device.

FIG. 5 is a flowchart illustrating processing executed by the server device 40 when receiving login information from the client device 10.

In step S301, the server device 40 receives login information sent from the client device 10.

The server device 40 has a user database in which the user names of all users authorized to use the office 60 and their passwords are stored in association with each other. In this user database, the user IDs assigned to the users when they entered the office 60 are also stored in association with the user names.

When receiving the login information in step S301, the server device 40 verifies the user name and the password indicated by the login information against the user name and the password registered in the user database. The server device 40 then determines in step S302 whether or not the user is an authorized user to use the office 60. If the user is an authorized user, in step S303, the server device 40 registers the seat number indicated by the login information in the database in association with the user name. Then, in step S304, the server device 40 sends a message indicating that the login operation has been accepted to the client device 10. Then, in step S305, the server device 40 sends the user ID of the user stored in the user database to the client device 10.

If the server device 40 determines in step S302 based on the login information that the user is not an authorized user, it sends a message indicating that the login operation has been rejected to the client device 10 in step S306.

Processing to be executed in the client device 10 when receiving a message that the login operation has been accepted or rejected has been discussed above (see FIG. 3).

(Print Instruction (Job))

The operation for giving a print instruction subsequent to the login operation will be discussed below.

Figure 6:
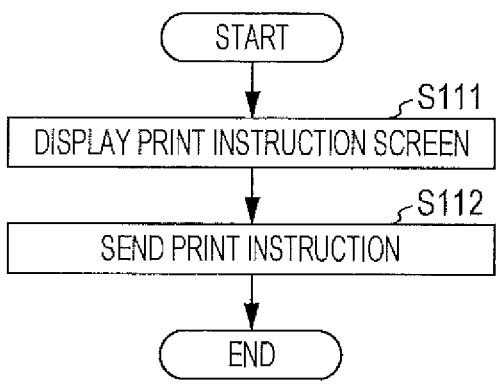
FIG. 6 is a flowchart illustrating processing executed by a client device when sending a print instruction.

FIG. 6 is a flowchart illustrating processing executed by the client device 10 when giving a print instruction.

Figure 7:
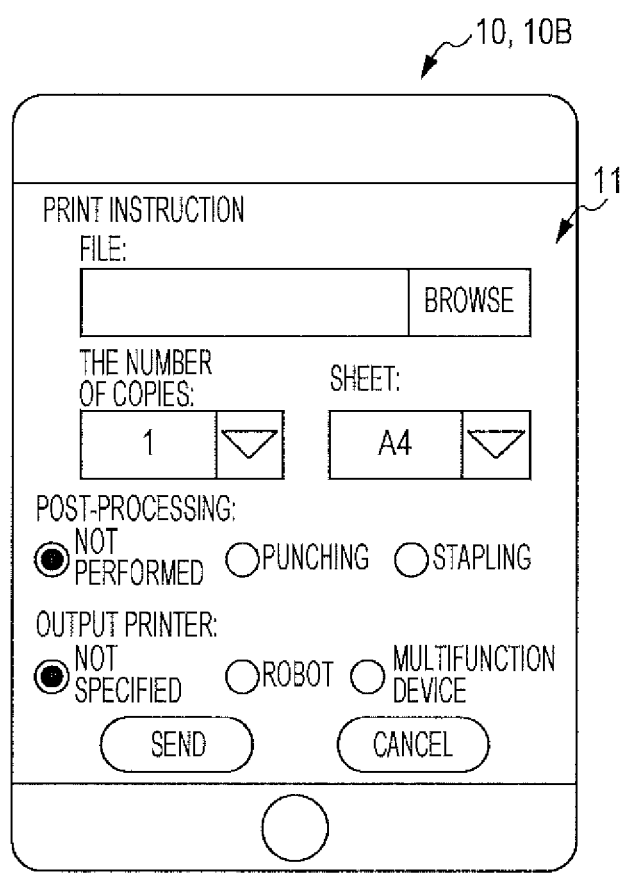
FIG. 7 illustrates a print instruction screen displayed on a display screen of a client device.

FIG. 7 illustrates a print instruction screen displayed on the display screen 11 of the client device 10.

In step S111, when giving a print instruction, the user operates the client device 10 so as to display the print instruction screen shown in FIG. 7 on the display screen. The user then inputs certain items of information into the fields "file", "the number of copies", "sheet", "post-processing", and "output printer" on the print instruction screen.

In the field of "file", a data file which stores data such as image data and character data to be printed is specified. In the field of "the number of copies", the number of print copies of this file is specified. In the initial setting, "1" is set. In the field of "sheet", the size of a sheet to be printed is specified. In the initial setting, "A4" is set. In the field of "post-processing", the user specifies whether to perform punching or stapling. In the initial setting, "not performed" indicating that no post-processing will be performed is set. In the field of "output printer", the user specifies whether the print job will be executed by the self-mobile printer 20 or the multifunction device 30. "Robot" is a nickname of the self-mobile printer 20. In the initial setting, "not specified" is set. In the case of "not specified", the server device 40 instructs the self-mobile printer 20 or the multifunction device 30 to perform printing according to the situation. Even if the user specifies "robot" or "multifunction device" as the output printer, the print operation may not be performed as specified, which will be discussed later.

After inputting the above-described items of information on the print instruction screen shown in FIG. 7, the user presses the "send" button. Then, in step S112, the items of information are sent to the server device 40 together with the user ID.

(Assigning of Job to Self-Mobile Printer or Multifunction Device)

Figure 8:
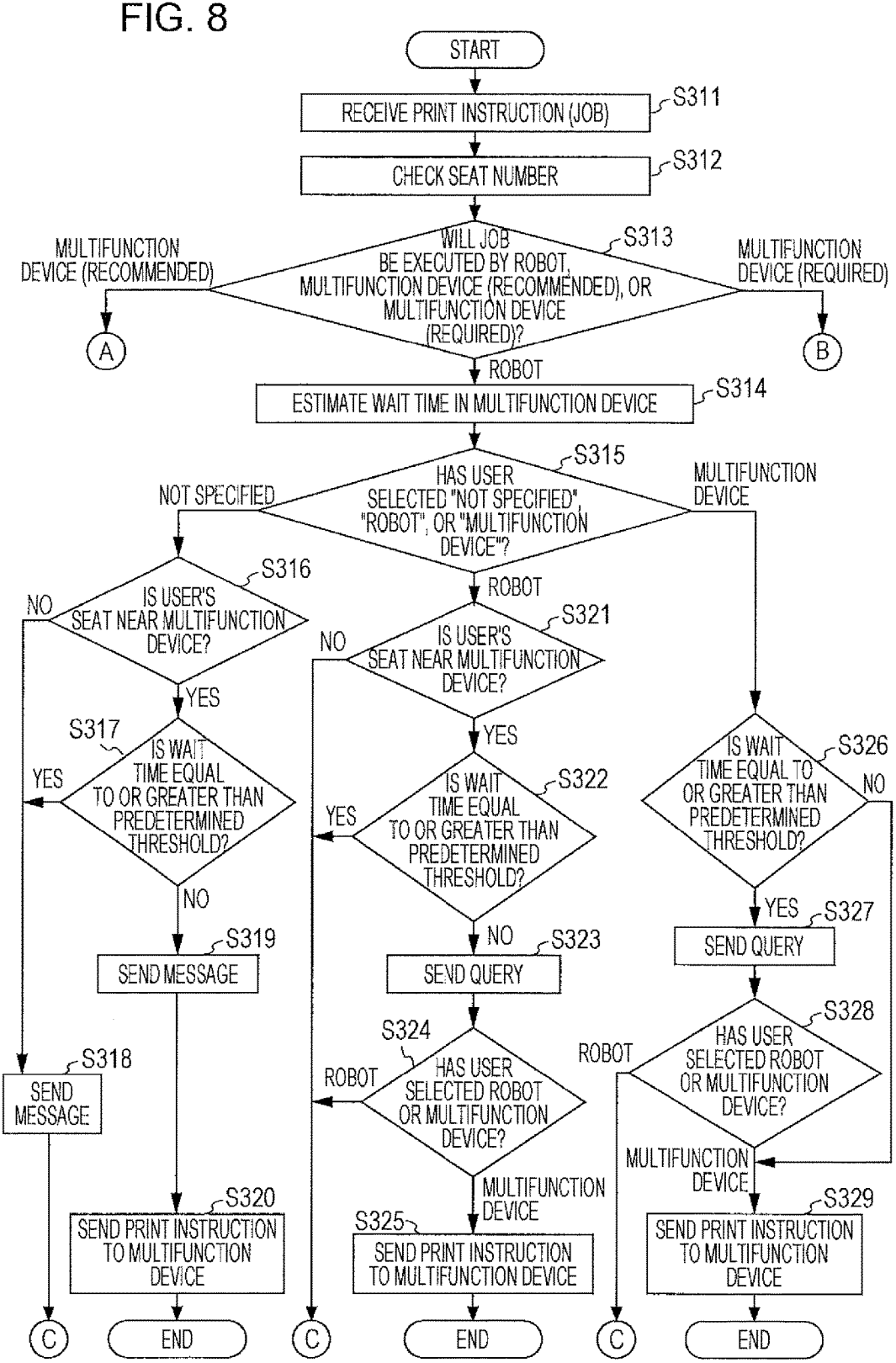
FIG. 8 is a flowchart illustrating part of processing executed by the server device when receiving a print instruction from a client device.

FIG. 8 is a flowchart illustrating part of processing executed by the server device 40 when receiving a print instruction from a client device 10.

In step S311, the server device 40 receives a print instruction (job) from the client device 10. Then, in step S312, the server device 40 first checks the seat number of the user on the basis of the user ID received together with the print instruction. Then, in step S313, the server device 40 determines, regardless of the output printer selected by the user on the print instruction screen shown in FIG. 7, whether this job is best suited to be executed by the robot (self-mobile printer 20) or by the multifunction device 30 (recommended level) and whether this job can be executed only by the multifunction device 30 (required level). For example, if this job involves printing of many sheets and it will take a long time for the self-mobile printer 20 to perform printing though the self-mobile printer 20 is capable of doing so, or if the file in this job contains complicated graphic data and it will take a long time for the self-mobile printer 20 to make preparations, such as the conversion of the file data into raster data, for printing, the server device 40 determines that the job will be executed by the multifunction device 30 (recommended level). If the size other than the A4 size is specified in the field of "sheet" in FIG. 7, or if "punching" or "stapling" is specified as "post-processing" in FIG. 7, only the multifunction device 30 can handle this job. Thus, the server device 40 determines that the job will be executed by the multifunction device 30 (required level).

The judgement concerning whether the job is best suited to be executed by the robot (self-mobile printer 20) or by the multifunction device 30 (recommended level) is also influenced by the status of the job congestion in each of the self-mobile printer 20 and the multifunction device 30 at the time when this judgement is made. By considering various factors, the server device 40 performs the optimal job assigning at the present time.

If it is determined in step S313 that the job is best suited to be executed by the robot (self-mobile printer 20), the server device 40 proceeds to step S314. In step S314, the server device 40 estimates the wait time in the multifunction device 30. That is, the server device 40 estimates, if the job from the user (client device 10) is sent to the multifunction device 30, how long the user has to wait before the job will start. The estimated wait time will be used in steps S317, S322, and S326 in this processing.

Then, the server device 40 determines in step S315 whether the user has selected "not specified", "robot", or "multifunction device" as "output printer". If it is determined in step S315 that the user has selected "not specified", the server device 40 proceeds to step S316. In step S316, the server device 40 compares the distance between the user's seat corresponding to the client device 10 which has given the print instruction (job) and the multifunction device 30 with a predetermined threshold, and determines whether or not the user's seat is near the multifunction device 30. Alternatively, a list in which the seat numbers of the chairs 62 (see FIG. 2) located near the multifunction device 30 are registered may be created in advance, and then, the server device 40 may determine whether or not the user's seat is near the multifunction device 30 according to whether or not the user's seat is registered in this list.

If it is determined in step S316 that the user's seat is near the multifunction device 30, the server device 40 proceeds to step S317 to determine whether or not the wait time in the multifunction device 30 estimated in step S314 is equal to or greater than a predetermined threshold. If it is determined in step S317 that the wait time is equal to or greater than the predetermined threshold or if it is determined in step S316 that the user's seat is not near the multifunction device 30, the server device 40 sends the message shown in FIG. 9 to the client device 10 in step S318. The server device 40 then proceeds to the processing shown in FIG. 18 for allocating this job to one self-mobile printer 20 or plural self-mobile printers 20, which will be discussed later.

Figure 9:
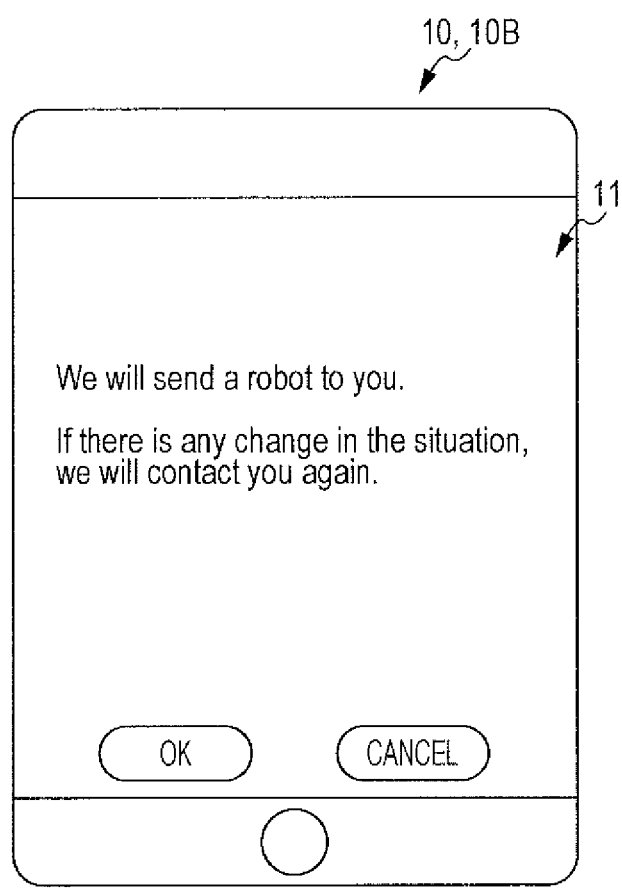
FIG. 9 illustrates a message screen displayed on a display screen of a client device which receives a message in the processing in FIG. 8.

FIG. 9 illustrates a message screen displayed on the display screen 11 of the client device 10 which has received the message in step S318.

On this message screen, a message "We will send a robot to you. If there is any change in the situation, we will contact you again," is displayed. If the user presses the OK button, this message screen disappears. If the user presses the cancel button, the print instruction (job) is canceled. Processing for canceling a print instruction is not shown or explained. The OK buttons and the cancel buttons of various screens discussed in the following description have the same functions as those on this screen, and an explanation thereof will thus be omitted.

Figure 10:
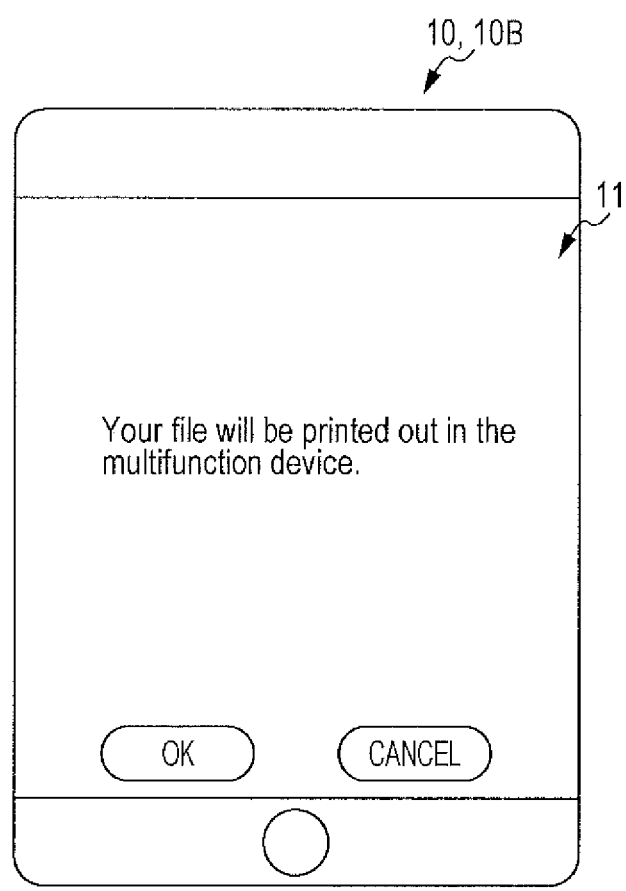
FIG. 10 illustrates a message screen displayed on a display screen of a client device which receives a message in the processing in FIG. 8.

Referring back to FIG. 8, if it is determined in step S316 that the user's seat is near the multifunction device 30 and if it is determined in step S317 that the wait time in the multifunction device 30 is smaller than the predetermined threshold, the server device 40 sends the message shown in FIG. 10 to the client device 10 in step S319. Then, the server device 40 sends the print instruction to the multifunction device 30 in step S320.

FIG. 10 illustrates a message screen displayed on the display screen 11 of the client device 10 which has received the message in step S319.

On this message screen, a message "Your file will be printed out in the multifunction device," is displayed.

If it is determined in step S315 that the user has specified "robot" (self-mobile printer 20) as "output printer", the server device 40 determines in step S321 whether or not the user's seat is near the multifunction device 30. If the user's seat is near the multifunction device 30, the server device 40 determines in step S322 whether or not the wait time in the multifunction device 30 is equal to or greater than the predetermined threshold. If it is determined in step S321 that the user's seat is not near the multifunction device 30 or if it is determined in step S322 that the wait time is equal to or greater than the predetermined threshold, the server device 40 proceeds to the processing shown in FIG. 18 for allocating this job to one self-mobile printer 20 or plural self-mobile printers 20. If it is determined in step S321 that the user's seat is near the multifunction device 30 and if it is determined in step S322 that the wait time is smaller than the predetermined threshold, the server device 40 sends the query message shown in FIG. 11 to the client device 10 in step S323.

Figure 11:
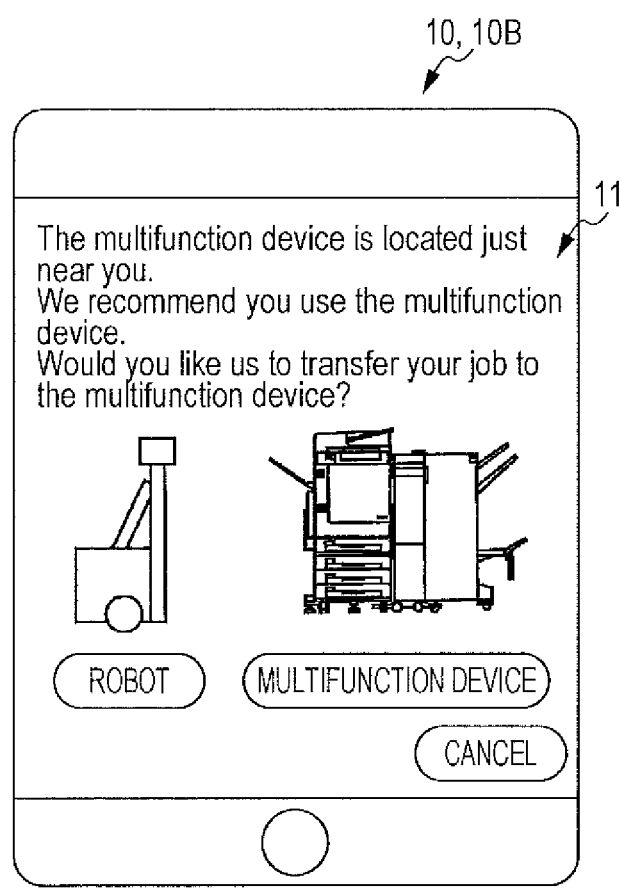
FIG. 11 illustrates a query message screen displayed on a display screen of a client device which receives a query message in the processing in FIG. 8.

FIG. 11 illustrates a query message screen displayed on the display screen 11 of the client device 10 which has received the query message in step S323.

On this query message screen, a query message that the multifunction device 30 is located just near the user and that the user is recommended to use the multifunction device 30 is displayed. On this query message screen, illustrations of the self-mobile printer 20 and the multifunction device 30 are shown, and two buttons, that is, a robot button and a multifunction device button, are displayed. The user presses the robot button or the multifunction device button. If the user presses the robot button, it means that the user has selected the self-mobile printer 20 to perform printing. If the user presses the multifunction device button, it means that the user has accepted the recommendation and selected the multifunction device 30 to perform printing. The cancel button is also displayed on this query message screen, and is used for canceling the print instruction, as discussed above.

Figure 18:
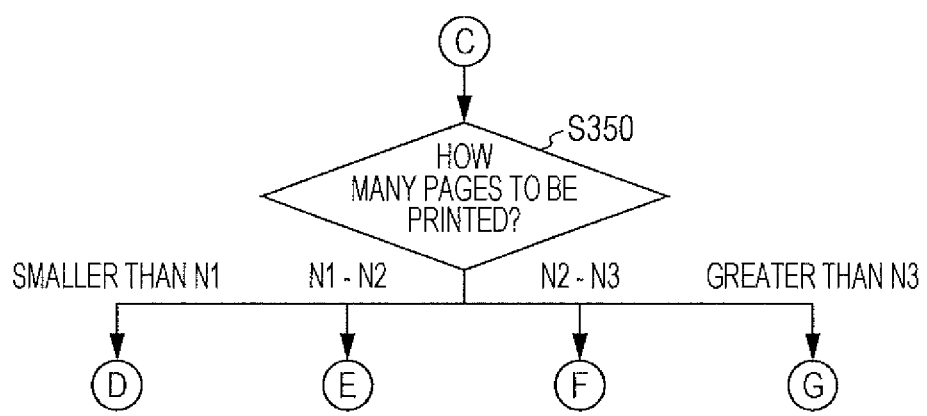
FIG. 18 is a flowchart illustrating the beginning part of processing for allocating print instructions (jobs) to self-mobile printers.

As a result of sending the query message in step S323, if it is determined in step S324 that the robot button has been pressed, the server device 40 proceeds to the processing shown in FIG. 18. If it is determined in step S324 that the multifunction device button has been pressed, the server device 40 sends the print instruction to the multifunction device 30 in step S325.

If it is determined in step S315 that the user has specified "multifunction device" as "output printer", the server device 40 determines in step S326 whether or not the wait time in the multifunction device 30 is equal to or greater than the predetermined threshold. If it is determined in step S326 that the wait time is smaller than the predetermined threshold, in step S329, the server device 40 sends the print instruction to the multifunction device 30 as the user has specified. If it is determined in step S326 that the wait time is equal to or greater than the predetermined threshold, the server device 40 sends the query message shown in FIG. 12 to the client device 10 in step S327.

Figure 12:
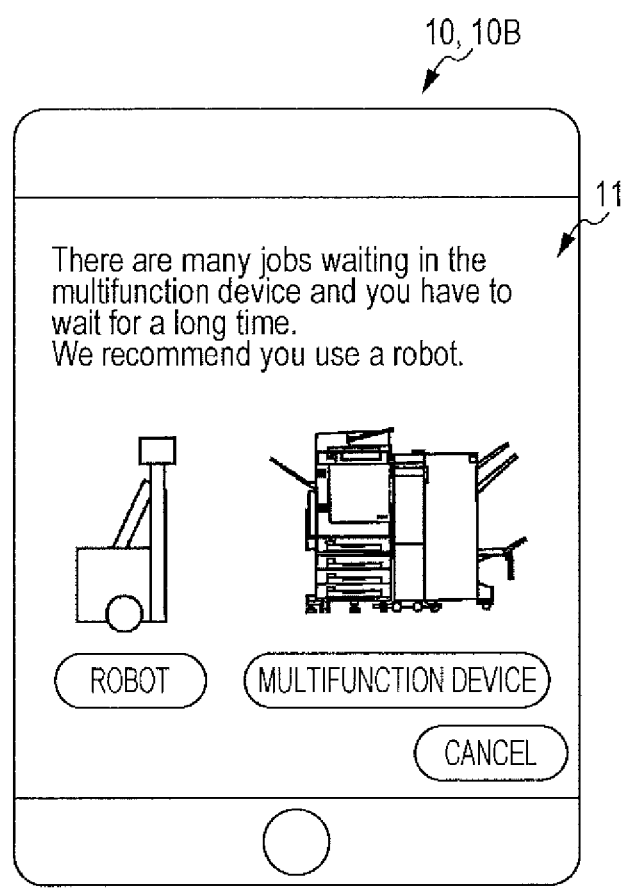
FIG. 12 illustrates a query message screen displayed on a display screen of a client device which receives a query message in the processing in FIG. 8.

FIG. 12 illustrates a query message screen displayed on the display screen 11 of the client device 10 which has received the query message in step S327.

On this query message screen, a query message that the user has to wait for a long time to print out by using the multifunction device 30 and is recommended to use a robot (self-mobile printer 20) is displayed. On this query message screen, illustrations and buttons similar to those shown in FIG. 11 are displayed.

As a result of sending the query message in step S327, if it is determined in step S328 that the robot button has been pressed, the server device 40 proceeds to the processing shown in FIG. 18. If it is determined in step S328 that the multifunction device button has been pressed, the server device 40 sends the print instruction to the multifunction device 30 in step S329.

A description will be given of a case in which it is determined in step S313 of FIG. 8 that the job is best suited to be executed by the multifunction device 30 (recommended level).

Figure 13:
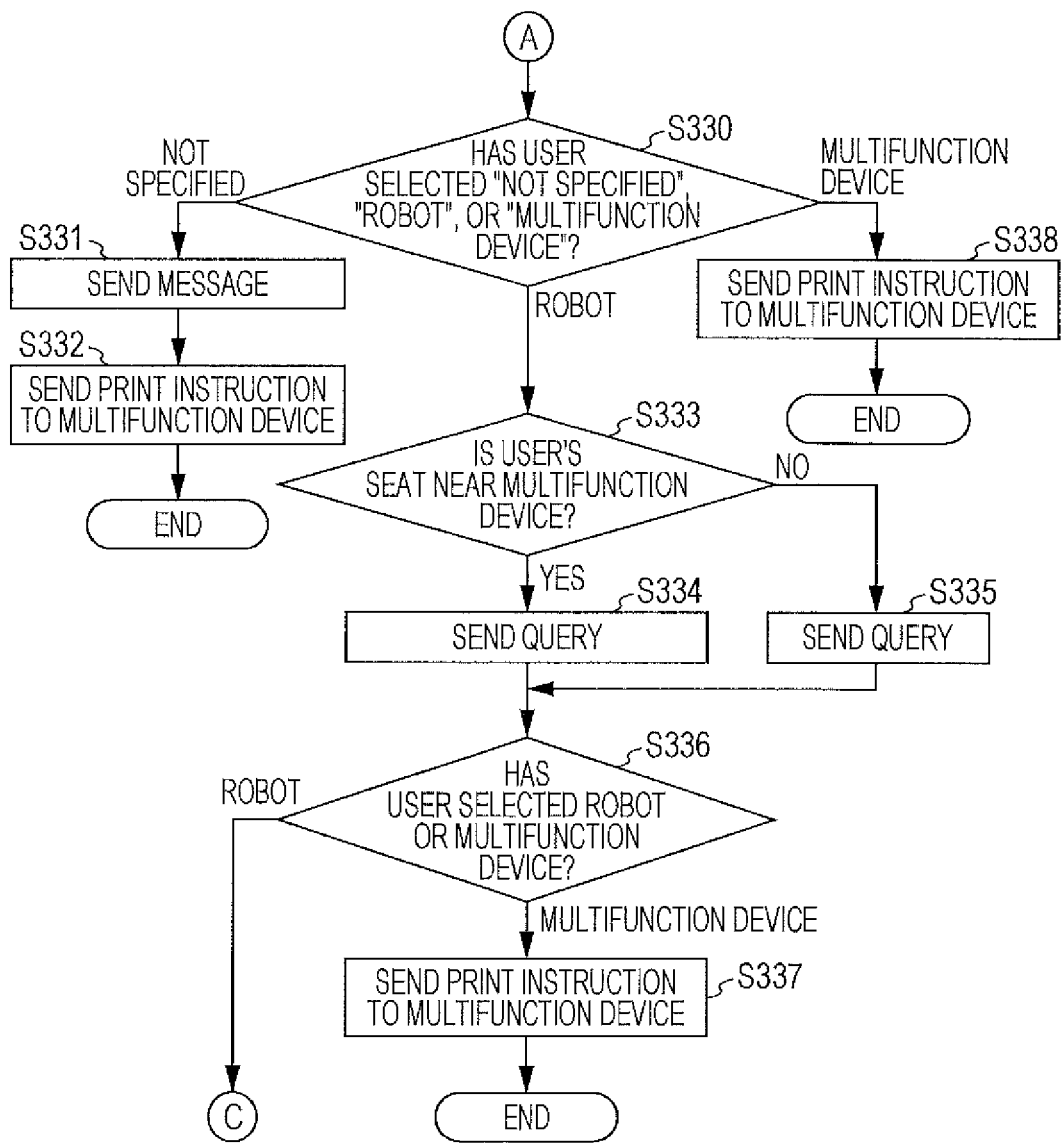
FIG. 13 is a flowchart illustrating processing executed by the server device when a job is best suited to be executed by the multifunction device (recommended level)

FIG. 13 is a flowchart illustrating processing executed by the server device 40 when it is determined in step S313 that the job is best suited to be executed by the multifunction device 30 (recommended level).

It is determined in step S330 whether the user has selected "not specified", "robot", or "multifunction device" as "output printer". If it is determined in step S330 that the user has selected "not specified", the server device 40 sends a message "Your file will be printed out in the multifunction device," shown in FIG. 10, to the client device 10 in step S331. Then, in step S332, the server device 40 sends the print instruction to the multifunction device 30.

If it is determined in step S330 that the user has selected "robot" as "output printer", it is determined in step S333 whether or not the user's seat corresponding to the client device 10 is near the multifunction device 30. If the user's seat is near the multifunction device 30, the server device 40 sends the query message shown in FIG. 14 to the client device 10 in step S334.

Figure 14:
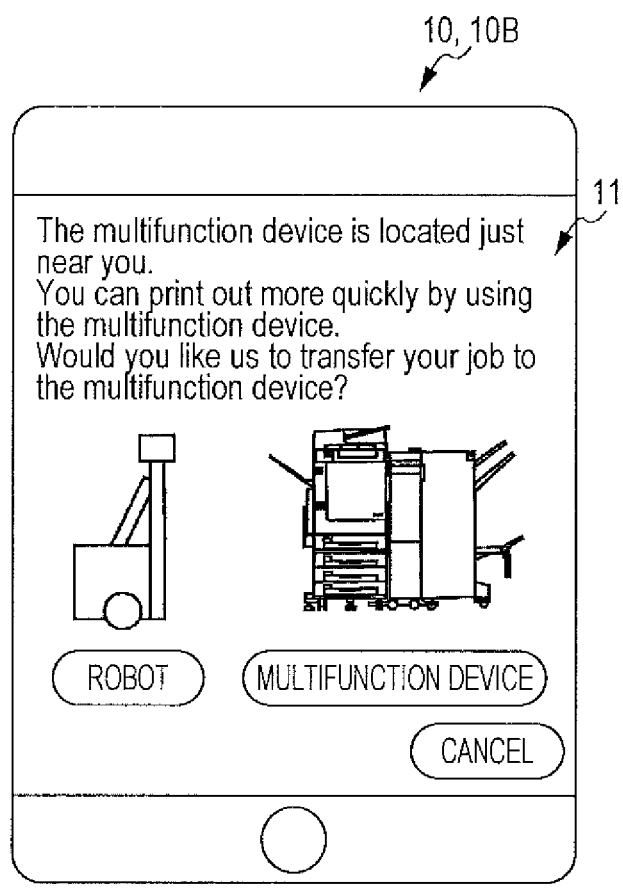
FIG. 14 illustrates a query message screen displayed on a display screen of a client device which receives a query message in the processing in FIG. 13.

FIG. 14 illustrates a query message screen displayed on the display screen 11 of the client device 10 which has received the query message in step S334.

On this query message screen, a query message that the multifunction device 30 is located just near the user and the user is recommended to use the multifunction device 30 because the user can print out more quickly by using the multifunction device 30 than by using the self-mobile printer 20 is displayed. On this query message screen, illustrations and buttons similar to those shown in FIG. 11 are displayed.

The server device 40 has determined in step S313 that the job is best suited to be executed by the multifunction device 30 (recommended level). Accordingly, even if it is determined in step S333 that the user's seat is not near the multifunction device 30, the server device 40 sends the query message shown in FIG. 15 to the client device 10 in step S335.

Figure 15:
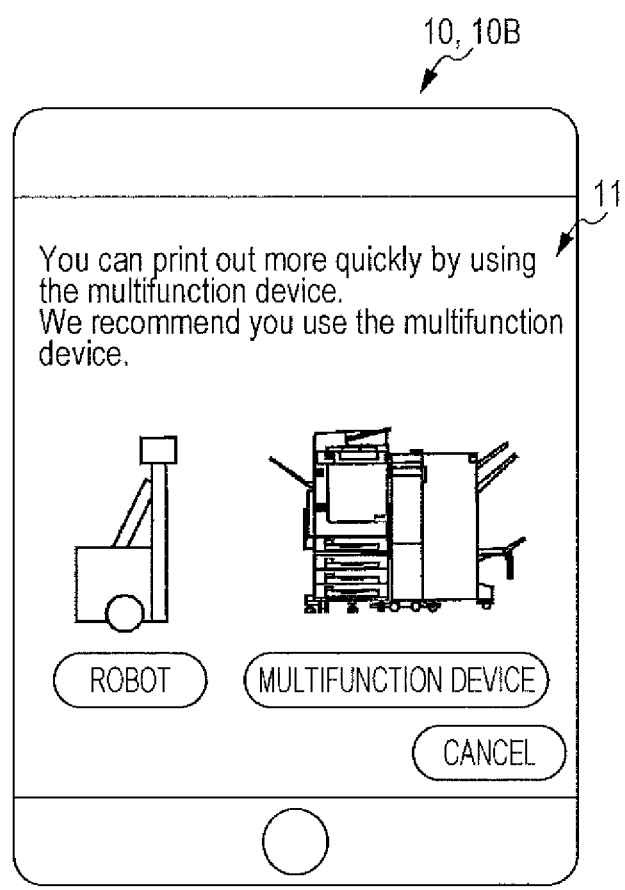
FIG. 15 illustrates a query message screen displayed on a display screen of a client device which receives a query message in the processing in FIG. 13.

FIG. 15 illustrates a query message screen displayed on the display screen 11 of the client device 10 which has received the query message in step S335.

On this query message screen, a query message that the user is recommended to use the multifunction device 30 because the user can print out more quickly by using the multifunction device 30 than by using the self-mobile printer 20 is displayed. On this query message screen, illustrations and buttons similar to those shown in FIGS. 11 and 14 are displayed.

As a result of sending the query message in step S334 or S335, if it is determined in step S336 that the robot button has been pressed, the server device 40 proceeds to the processing shown in FIG. 18. If it is determined in step S336 that the multifunction device button has been pressed, the server device 40 sends the print instruction to the multifunction device 30 in step S337.

If it is determined in step S330 that the user has selected "multifunction device" as "output printer", the server device 40 sends the print instruction to the multifunction device 30 in step S338.

A description will be given of a case in which it is determined in step S313 of FIG. 8 that the job is best suited to be executed by the multifunction device 30 (required level).

Figure 16:
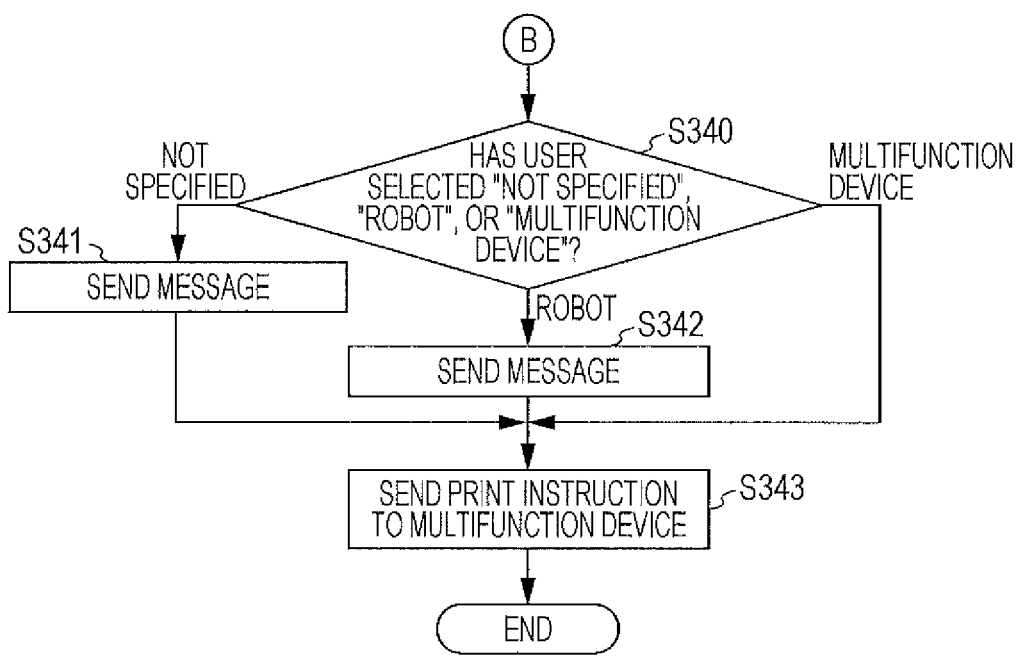
FIG. 16 is a flowchart illustrating processing executed by the server device when a job is best suited to be executed by the multifunction device (required level)

FIG. 16 is a flowchart illustrating processing executed by the server device 40 when it is determined in step S313 that the job is best suited to be executed by the multifunction device 30 (required level).

It is determined in step S340 whether the user has selected "not specified", "robot", or "multifunction device" as "output printer". If it is determined in step S340 that the user has selected "not specified", the server device 40 sends a message "Your file will be printed out in the multifunction device," shown in FIG. 10 to the client device 10 in step S341. In step S343, the server device 40 sends the print instruction to the multifunction device 30.

Figure 17:
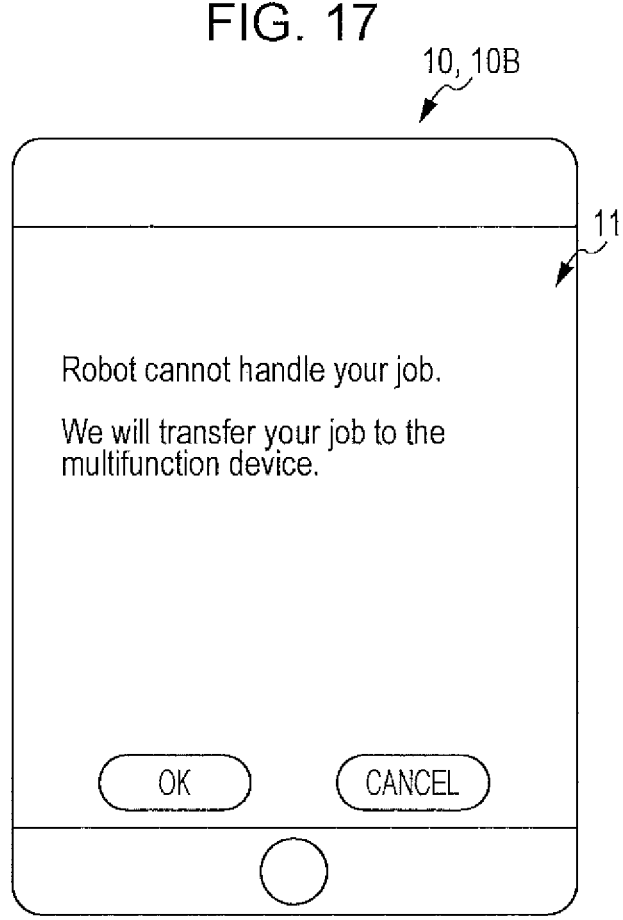
FIG. 17 illustrates a message screen displayed on a display screen of a client device which receives a message in the processing in FIG. 16.

If it is determined in step S340 that the user has specified "robot" as "output printer", the server device 40 sends the message shown in FIG. 17 to the client device 10 in step S342. In step S343, the server device 40 sends the print instruction to the multifunction device 30.

FIG. 17 illustrates a message screen displayed on the display screen 11 of the client device 10 which has received the query message in step S342.

On this message screen, a message that the print job will be transferred to the multifunction device 30 since the robot (self-mobile printer 20) is not able to handle the print job is displayed.

If it is determined in step S340 that the user has specified "multifunction device", the server device 40 sends the print instruction to the multifunction device 30 in step S343.

(Job Distribution Among Self-Mobile Printers)

FIG. 18 is a flowchart illustrating the beginning part of processing for allocating print instructions (jobs) to the self-mobile printers 20.

The processing shown in FIG. 18 branches off in step S350 according to the number of print pages indicated in a print job.

Figures 19, 20:
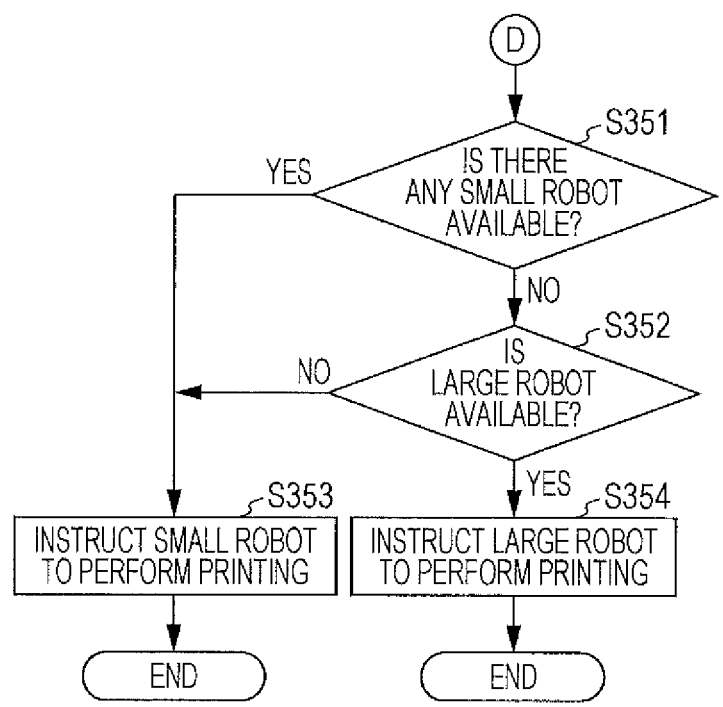
FIG. 19 is a table indicating the association between the number of print pages in a job and the self-mobile printer to which the job is assigned.
FIG. 20 is a flowchart illustrating processing to be executed when the number of print pages is smaller than N1.

FIG. 19 is a table indicating the association between the number of print pages in a print job and the self-mobile printer 20 to which the print job is assigned. The table shown in FIG. 19 indicates the following associations.

If the number of print pages is smaller than N1, printing is performed by one small self-mobile printer 20B.

If the number of print pages is N1 to N2, printing is performed by one large self-mobile printer 20A or two small self-mobile printers 20B.

If the number of print pages is N2 to N3, printing is performed by one large self-mobile printer 20A and one small self-mobile printer 20B.

If the number of print pages is greater than N3, printing is performed by one large self-mobile printer 20A and two small self-mobile printers 20B, that is, all the three self-mobile printers 20 included in the print system 100 shown in FIG. 1.

The association between the number of print pages and the self-mobile printer 20 to be assigned shown in FIG. 19 is only a standard example. In actuality, self-mobile printers 20 to which a print job is assigned vary according to the operating conditions of the self-mobile printers 20.

In the processing shown in FIG. 18, step S350 branches off only by the number of print pages. However, step S350 may branch off also depending on the time required for making preparations for printing, such as the conversion of image data, as discussed above.

Referring back to FIG. 18, if it is determined in step S350 that the number of print pages is smaller than N1, the server device 40 proceeds to the processing shown in FIG. 20.

FIG. 20 is a flowchart illustrating processing to be executed when it is determined in step S350 of FIG. 18 that the number of print pages of the print job is smaller than N1.

This print job is a job requiring printing in small quantities. Basically, printing is performed by one small self-mobile printer 20B, as indicated in the table of FIG. 19.

In step S351, it is first checked whether or not there is a small self-mobile printer 20B in the standby state (that is, a small self-mobile printer 20B is available for use). If there is a small self-mobile printer 20B in the standby state, the server device 40 instructs this small self-mobile printer 20B to take charge of printing in step S353. If it is found in step S351 that both of the small self-mobile printers 20B are in the standby state, the small self-mobile printer 20B located nearer the user's seat will take charge of printing.

If it is found in step S351 that there is no small self-mobile printer 20B in the standby state (all of them are in the operating state), it is checked in step S352 whether or not the large self-mobile printer 20A is available. If the large self-mobile printer 20A is available, the server device 40 instructs the large self-mobile printer 20A to take charge of printing in step S354.

If the large self-mobile printer 20A is not available (that is, it is not in the standby state, but in the operating state), the server device 40 instructs one of the two small self-mobile printers 20B to take charge of printing in step S353. Although this small self-mobile printer 20B is in the operating state, it inputs this print instruction (job) in the queue, and after executing the previous print jobs in the queue, it executes this print job.

Figure 21:
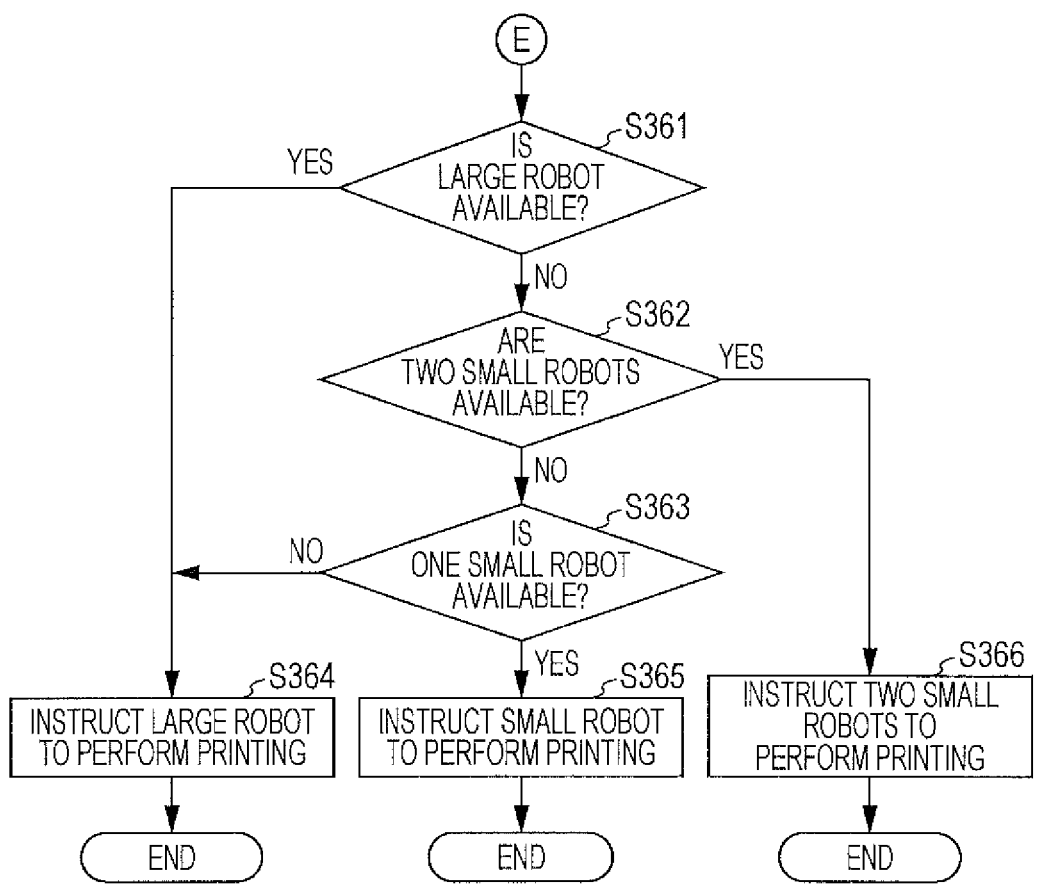
FIG. 21 is a flowchart illustrating processing to be executed when the number of print pages is N1 to N2.

FIG. 21 is a flowchart illustrating processing to be executed when it is determined in step S350 of FIG. 18 that the number of print pages of the print job is N1 to N2.

In this case, basically, printing is performed by one large self-mobile printer 20A or two small self-mobile printers 20B, as indicated in the table of FIG. 19.

In step S361, it is first checked whether or not the large self-mobile printer 20A is available (that is, it is in the standby state). If the large self-mobile printer 20A is available, the server device 40 instructs the large self-mobile printer 20A to take charge of printing in step S364. If it is found in step S361 that the large self-mobile printer 20A is not available, it is then checked in step S362 whether or not the two small self-mobile printers 20B are available. If the two small self-mobile printers 20B are available, the server device 40 instructs the small self-mobile printers 20B to take charge of printing in step S366.

In this case, since printing is performed by the two small self-mobile printers 20B, it is necessary to distribute the print job over the two small self-mobile printers 20B. Accordingly, the server device 40 divides the print instruction (job) into two instructions (jobs). The performance of the two small self-mobile printers 20B is the same. Thus, the server device 40 divides the print job into two jobs so that the number of pages to be printed by the two small self-mobile printers 20B will be roughly the same. For example, if the number of print copies is one and one copy includes many pages, the server device 40 divides the pages into the first part and the second part. If the number of print copies is more than one (for example, four), the two small self-mobile printers 20B may each print out two copies. If it takes time to make preparations for printing, such as the conversion of image data, the pages of one copy, even if multiple copies are printed, may be divided so that the time required to make preparations can be distributed over both of the small self-mobile printers 20B.

If it is found in step S362 that neither of the two small self-mobile printers 20B is available or that only one of the small self-mobile printers 20B is available, it is checked in step S363 whether or not one small self-mobile printer 20B is available. If one small self-mobile printer 20B is available, the server device 40 instructs this small self-mobile printer 20B to take charge of printing in step S365. Since this print job involves printing in rather large quantities (N1 to N2), it will take a rather long time to perform printing by using the single small self-mobile printer 20B. However, since only one small self-mobile printer 20B is available under the present operating conditions, this self-mobile printer 20B performs printing.

If it is found in step S363 that neither of the small self-mobile printers 20B is available, the server device 40 instructs the large self-mobile printer 20A to take charge of printing in step S364. Although the large self-mobile printer 20A is in the operating state, it inputs this print instruction (job) in the queue, and after executing the previous print jobs in the queue, it executes this print job.

Figure 22:
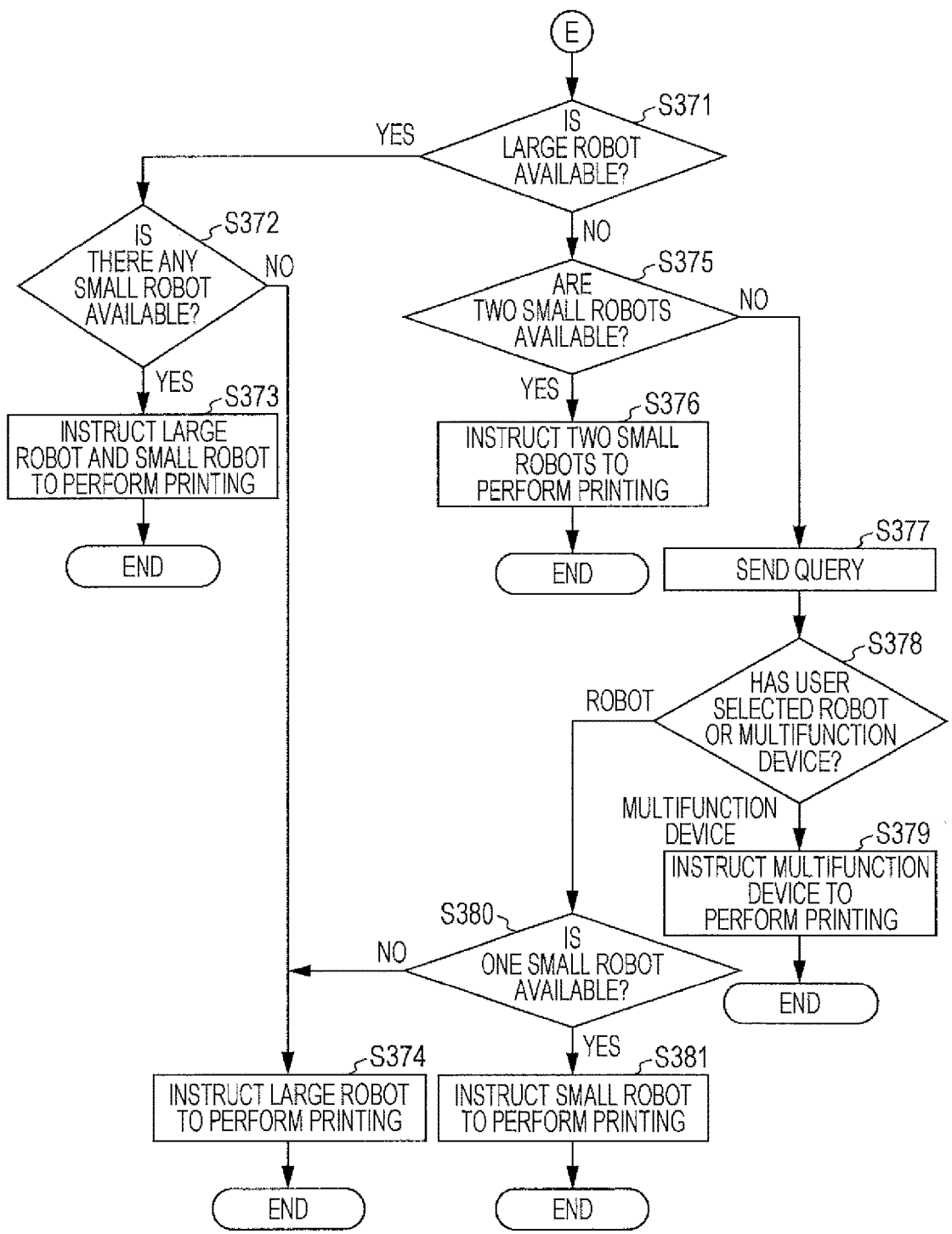
FIG. 22 is a flowchart illustrating processing to be executed when the number of print pages is N2 to N3.

FIG. 22 is a flowchart illustrating processing to be executed when it is determined in step S350 of FIG. 18 that the number of print pages of the print job is N2 to N3.

In this case, basically, printing is performed by one large self-mobile printer 20A and one small self-mobile printer 20B, as indicated in the table of FIG. 19.

In step S371, it is first checked whether or not the large self-mobile printer 20A is available. If the large self-mobile printer 20A is available, it is found in step S372 whether or not there is any small self-mobile printer 20B available. If there is a small self-mobile printer 20B available, the server device 40 instructs the large self-mobile printer 20A and this small self-mobile printer 20B to take charge of printing in step S373. The algorithm for distributing the job over the large self-mobile printer 20A and the small self-mobile printer 20B is not particularly restricted to a specific one. However, the job is distributed over the large self-mobile printer 20A and the small self-mobile printer 20B according to their performance so that they can finish printing almost at the same time.

If it is found in step S372 that there is no small self-mobile printer 20B available, the server device 40 instructs the large self-mobile printer 20A to take charge of printing in step S374.

If it is found in step S371 that the large self-mobile printer 20A is not available, it is found in step S375 whether or not two small self-mobile printers 20B are available. If two small self-mobile printers 20B are available, the server device 40 instructs the two small self-mobile printers 20B to take charge of printing in step S376.

If it is found in step S375 that neither of the two small self-mobile printers 20B is available or that only one of the small self-mobile printers 20B is available, the server device 40 sends the following query message to the client device 10 in step S377.

Figure 23:
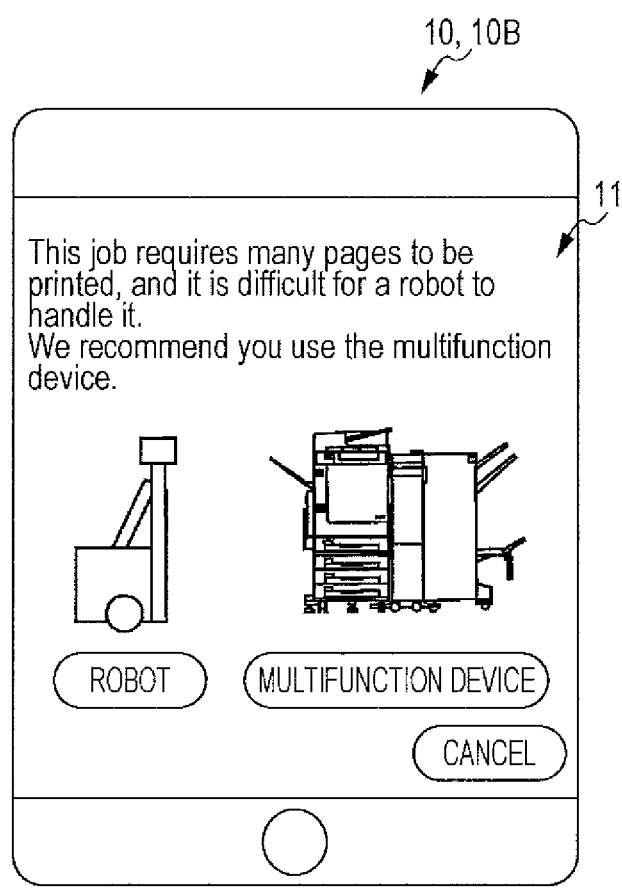
FIG. 23 illustrates a query message screen displayed on a display screen of a client device which receives a query message in the processing in FIG. 22.

FIG. 23 illustrates a query message screen displayed on the display screen 11 of the client device 10 which has received the query message in step S377.

On this query message screen, a query message that it is difficult for the robot (self-mobile printer 20) to handle this job since there are too many print pages and that the user is recommended to use the multifunction device 30 is displayed. On this query message screen, illustrations and buttons similar to those shown in FIG. 11 are displayed.

If the answer from the client device 10 received in step S378 in response to the query message sent in step S377 indicates that the user has selected "robot" (that is, the user has not accepted the recommendation), it is checked in step S380 whether or not one small self-mobile printer 20B is available. If one small self-mobile printer 20B is available, the server device 40 instructs this small self-mobile printer 20B to take charge of printing in step S381. This print job involves printing in large quantities (N2 to N3), and it will take a long time to perform printing. In this case, however, one small self-mobile printer 20B performs printing by respecting user's instruction.

If it is found in step S380 that neither of the small self-mobile printers 20B is available, the server device 40 instructs the large self-mobile printer 20A in the operating state to take charge of printing in step S374. The large self-mobile printer 20A inputs this print instruction (job) in the queue, and after executing the previous print jobs in the queue, it executes this print job.

If the answer from the client device 10 received in step S378 indicates that the user has selected "multifunction device" (that is, the user has accepted the recommendation), the server device 40 instructs the multifunction device 30 to take charge of printing in step S379.

Figure 24:
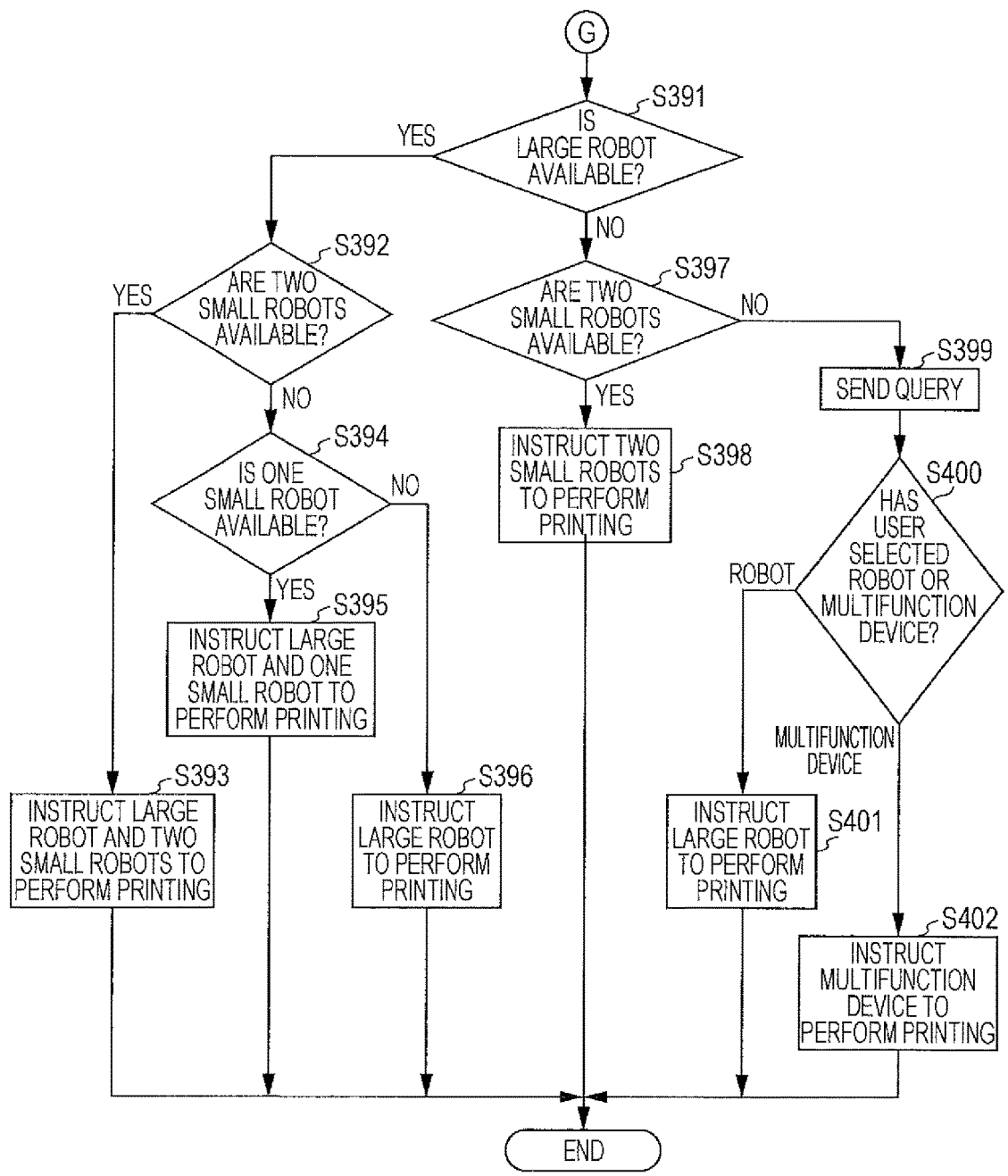
FIG. 24 is a flowchart illustrating processing to be executed when the number of print pages is greater than N3.

FIG. 24 is a flowchart illustrating processing to be executed when it is determined in step S350 of FIG. 18 that the number of print pages of the print job is greater than N3.

This print job is a job involving printing in extremely large quantities, and is basically performed by one large self-mobile printer 20A and two small self-mobile printers 20B, as indicated in the table of FIG. 19.

In step S391, it is first checked whether or not the large self-mobile printer 20A is available. If the large self-mobile printer 20A is available, it is found in step S392 whether or not both of the small self-mobile printers 20B are available. If both of the small self-mobile printers 20B are available, the server device 40 instructs the large self-mobile printer 20A and the two small self-mobile printers 20B to take charge of printing in step S393. In this case, the job is distributed over the large self-mobile printer 20A and the two small self-mobile printers 20B according to their performance so that they can finish printing almost at the same time.

If it is found in step S392 that neither of the two small self-mobile printers 20B is available or that only one of the small self-mobile printers 20B is available, it is found in step S394 whether or not one small self-mobile printer 20B is available. If one small self-mobile printer 20B is available, the server device 40 instructs the large self-mobile printer 20A and this small self-mobile printer 20B to take charge of printing in step S395. If one small self-mobile printer 20B is not available, the server device 40 instructs the large self-mobile printer 20A to take charge of printing in step S396.

If it is found in step S391 that the large self-mobile printer 20A is not available, it is found in step S397 whether or not both of the small self-mobile printers 20B are available. If both of the small self-mobile printers 20B are available, the server device 40 instructs the two small self-mobile printers 20B to take charge of printing in step S398.

If it is found in step S397 that neither of the two small self-mobile printers 20B is available or that only one of the small self-mobile printers 20B is available, the server device 40 sends the query message shown in FIG. 23 to the client device 10 in step S399.

The query message shown in FIG. 23 has been discussed above, and will not be explained again.

If the answer from the client device 10 received in step S400 in response to the query message sent in step S399 indicates that the user has selected "robot", the server device 40 instructs the large self-mobile printer 20A in the operating state to take charge of printing in step S401, regardless of whether or not one small self-mobile printer 20B is available. If printing is performed only by one small self-mobile printer 20B, it will take too much time, and this small self-mobile printer 20B will be occupied for a long time only by this job. Because of this reason, the server device 40 does not allow only one small self-mobile printer 20B to execute the print job. The large self-mobile printer 20A in the operating state inputs this print instruction (job) in the queue, and after executing the previous print jobs in the queue, it executes this print job.

If the answer from the client device 10 received in step S400 indicates that the user has selected "multifunction device", the server device 40 instructs the multifunction device 30 to take charge of printing in step S402.

In the print system 100 (see FIG. 1) of this exemplary embodiment, if plural self-mobile printers 20 are available (standby state) and if there are relatively many pages to be printed in one job, this print job is distributed over the plural self-mobile printers 20. As a result, it is possible to improve user services and to implement the efficient operation of the self-mobile printers 20.

Job distribution among the plural self-mobile printers 20 has been discussed above. Another aspect of the print system 100 of this exemplary embodiment will be described below.
(Job Transfer from One Printer to Another Printer: Part One)

Each self-mobile printer 20 forming the print system 100 of this exemplary embodiment constantly monitors its own self-mobile printer 20. If any irregular situation where printing has to be interrupted, such as paper out, ink (toner) out, and a paper jam, arises, the self-mobile printer 20 detects the occurrence of such a situation and reports it to the server device 40. In this case, progress information concerning the progress of a print job indicating how far printing has correctly been performed, such as until which page of which copy in the job has correctly been printed, is also supplied to the server device 40.

Figure 25:
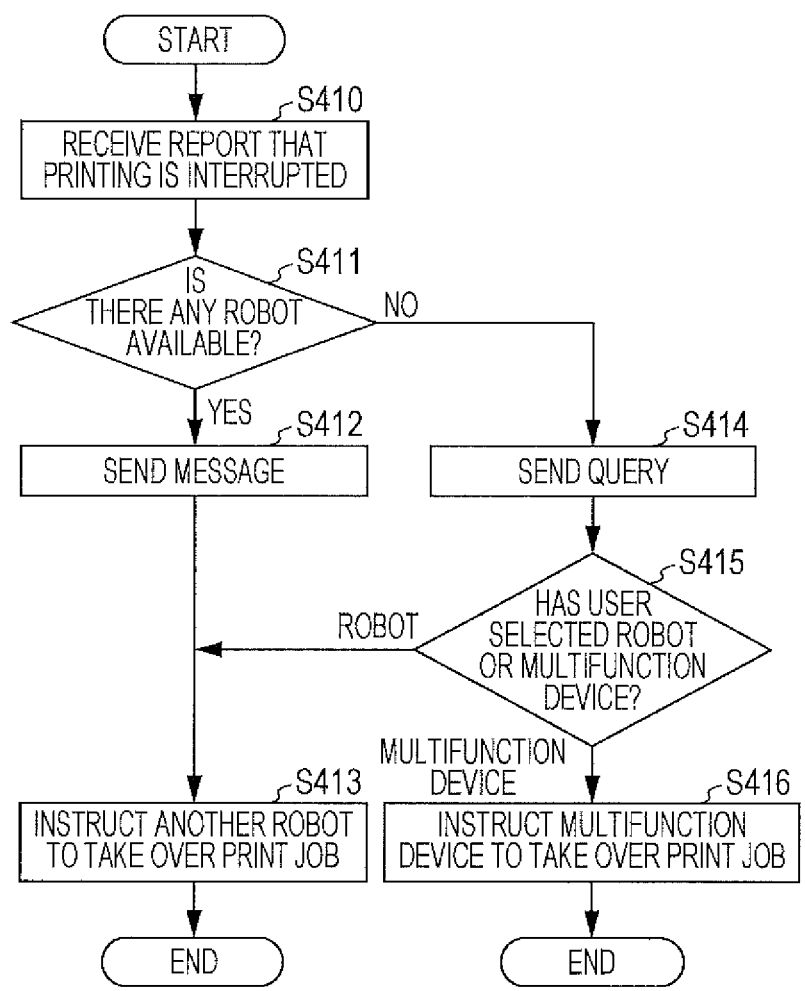
FIG. 25 is a flowchart illustrating processing executed by the server device when receiving a report from a self-mobile printer that printing is interrupted.

FIG. 25 is a flowchart illustrating processing executed by the server device 40 when receiving a report from a self-mobile printer 20 that printing is interrupted.

Upon receiving a report that printing is interrupted in step S410, the server device 40 checks in step S411 whether or not there is a self-mobile printer 20 available (that is, the self-mobile printer 20 is in the standby state). If there is a self-mobile printer 20 available, in step S412, the server device 40 sends the message shown in FIG. 26 to the client device 10 which has sent the report. Then, in step S413, the server device 40 sends an instruction to take over the print job to the self-mobile printer 20 in the standby state, together with the above-described progress information. If there are other jobs in the queue of the self-mobile printer 20 which has sent the report, the server device 40 instructs the self-mobile printer 20 in the standby state also to take over these jobs.

Figure 26:
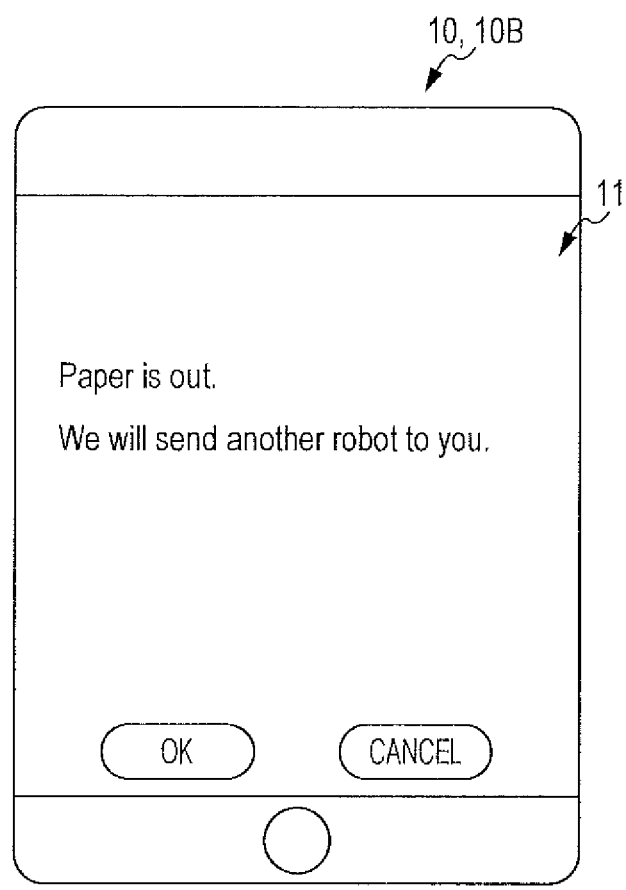
FIG. 26 illustrates a message screen displayed on a display screen of a client device which receives a message in the processing in FIG. 25.

FIG. 26 illustrates a message screen displayed on the display screen 11 of the client device 10 which has received the message in step S412.

On this message screen, a message that paper is out, that is, paper stored in the self-mobile printer 20 is out, is displayed.

On this message screen, the reason why printing is interrupted (in this case, paper out) and information that this print job will be taken over to another self-mobile printer 20 are displayed.

Figure 27:
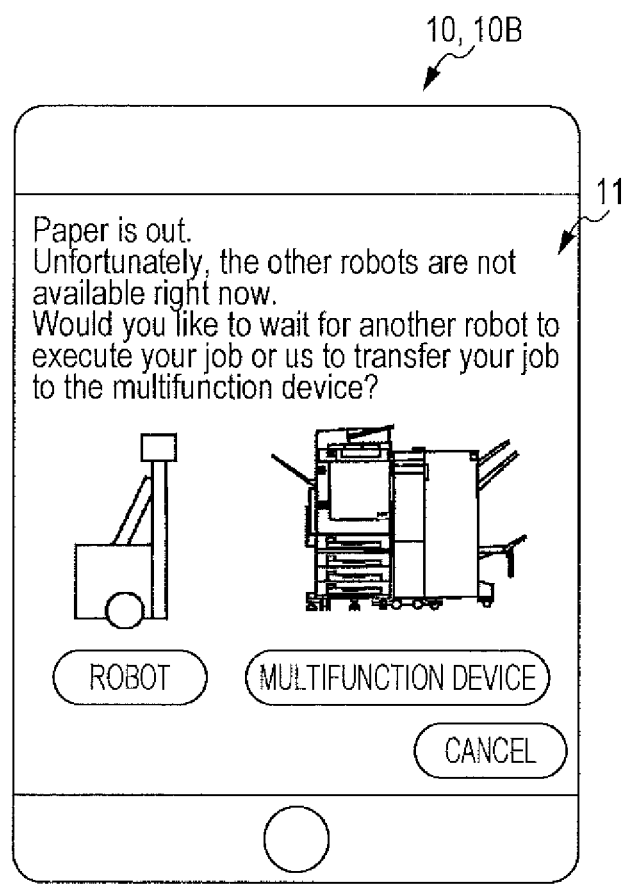
FIG. 27 illustrates a query message screen displayed on a display screen of a client device which receives a query message in the processing in FIG. 25.

Referring back to FIG. 25, if it is found in step S411 that there is no self-mobile printer 20 in the standby state, the server device 40 sends the query message shown in FIG. 27 to the client device 10 in step S414.

FIG. 27 illustrates a message screen displayed on the display screen 11 of the client device 10 which has received the query message in step S414.

On this message screen, the reason why printing is interrupted and a query about whether the user would like to wait for another self-mobile printer 20 to become available or to transfer the print job to the multifunction device 30 are displayed.

If the answer from the client device 10 received in step S415 in response to the query message sent in step S414 indicates that the user has selected "robot", the server device 40 instructs another self-mobile printer 20 in the operating state to take over the print job in step S413. If the answer from the client device 10 indicates that the user has selected "multifunction device", the server device 40 instructs the multifunction device 30 to take over the print job in step S416.

The processing shown in FIG. 25 is executed without considering whether it is the large self-mobile printer 20A or a small self-mobile printer 20B that has sent a report that printing is interrupted. However, the server device 40 may perform control, depending on whether it is the large self-mobile printer 20A or a small self-mobile printer 20B that has sent such a report. If the large self-mobile printer 20A has sent a report, the number of remaining pages that have not been printed and jobs in the queue of the large self-mobile printer 20A are checked. If the server device 40 determines that the burden on a small self-mobile printer 20B will be too heavy if the small self-mobile printer 20B takes over the job, the server device 40 sends a query message similar to that sent in step S414 to the client device 10 and recommends that the client device 10 select the multifunction device 30 to take over the job. Alternatively, the server device 40 may simply instruct the multifunction device 30 to take over the job without asking the user, by sending a message that the multifunction device 30 will take over the job to the client device 10.

In the print system 100 of this exemplary embodiment, one print job received from a client device 10 may be transferred from one self-mobile printer 20 to another self-mobile printer 20 or to the multifunction device 30. With this configuration, even if any irregular situation where printing is interrupted arises, a minimum level of user services is still maintained.

(Job Transfer from One Printer to Another Printer: Part Two)

Job transfer from one self-mobile printer 20 to another self-mobile printer 20 or to the multifunction device 30 in another situation will be discussed below.

As discussed above, the layout of the entire office 60 (see FIG. 2) is stored in the server device 40 as data, and data is sent to the self-mobile printer 20 if necessary. However, if a user temporarily places something in a space in the office 60 or if some users are talking in a space other than at their desks, the server device 40 is not able to detect such an irregular situation. For handling such an irregular situation, each self-mobile printer 20 forming the print system 100 of this exemplary embodiment is equipped with the above-described camera 21 and is capable of moving while avoiding obstacles in its moving direction by constantly monitoring a space ahead. If the self-mobile printer 20 finds it impossible to avoid an obstacle on its way and to move further ahead, it searches for another route to reach the user. If the self-mobile printer 20 still finds it impossible to reach the user, it reports such a situation to the server device 40.

Figure 28:
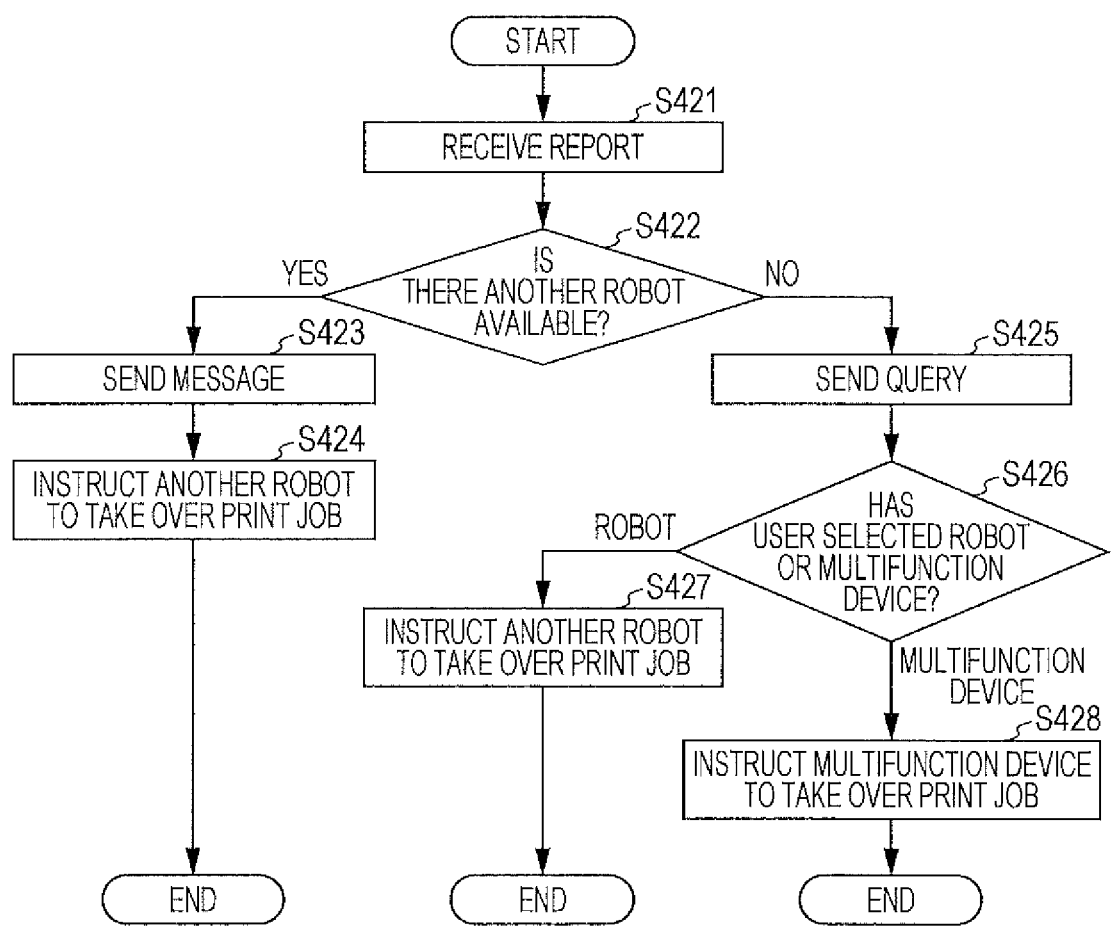
FIG. 28 is a flowchart illustrating processing executed by the server device when receiving a report from a self-mobile printer that the self-mobile printer has been blocked on its way to a user.

FIG. 28 is a flowchart illustrating processing executed by the server device 40 when receiving a report from a self-mobile printer 20 that the self-mobile printer 20 has been blocked on its way to a user.

In step S421, the server device 40 receives a report from a self-mobile printer 20 that the self-mobile printer 20 is blocked on its way to a user. Then, the server device 40 checks in step S422 whether or not there is a self-mobile printer 20 in the standby state. If there is a self-mobile printer 20 in the standby state, the server device 40 sends the message shown in FIG. 29 to the client device 10 of this user in step S423. Then, in step S424, the server device 40 instructs this self-mobile printer 20 to take over the print job to perform printing. The standby positions (see FIG. 2) of the plural self-mobile printers 20 are different. Accordingly, even though one self-mobile printer 20 is unable to reach a specific user, another self-mobile printer 20 may be able to reach this user. In this case, however, even if there are jobs in the queue of the self-mobile printer 20 which has been blocked on its way, the server device 40 does not instruct another self-mobile printer 20 to take over such jobs. This is because the self-mobile printer 20 which has been blocked on its way to a specific user may be able to reach another user who has sent a job in the queue.

Figure 29:
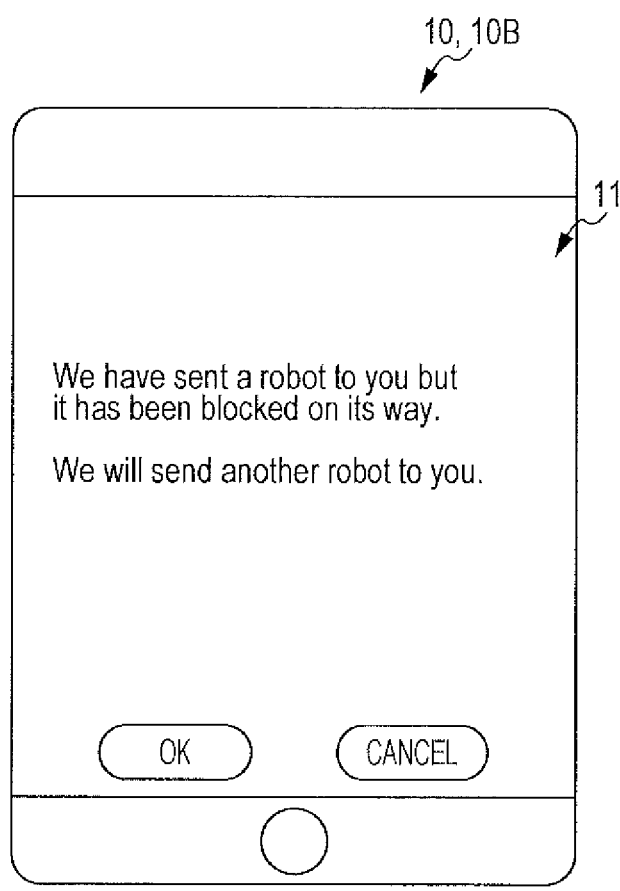
FIG. 29 illustrates a message screen displayed on a display screen of a client device which receives a message in the processing in FIG. 28.

FIG. 29 illustrates a message screen displayed on the display screen 11 of the client device 10 which has received the message in step S423.

On this message screen, a message that the self-mobile printer 20 has been blocked on its way and another self-mobile printer 20 will be sent to the user is displayed.

Figure 30:
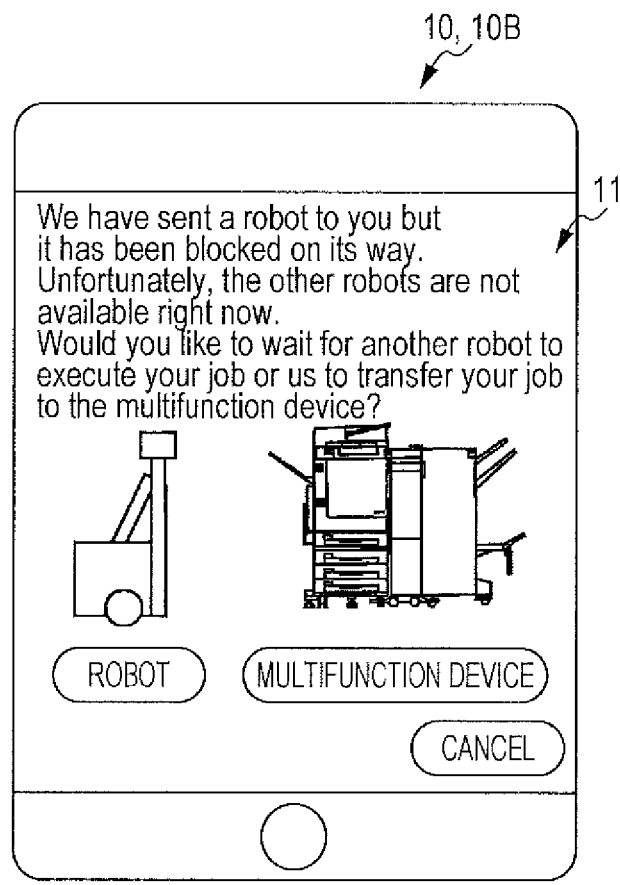
FIG. 30 illustrates a query message screen displayed on a display screen of a client device which receives a query message in the processing in FIG. 28.

If it is found in step S422 that there is no self-mobile printer 20 in the standby state, the server device 40 sends the query message shown in FIG. 30 to the client device 10 in step S425.

FIG. 30 illustrates a message screen displayed on the display screen 11 of the client device 10 which has received the query message in step S425.

On this message screen, a message that the self-mobile printer 20 has been blocked on its way and there is no other self-mobile printers 20 available, and a query about whether the user would like to wait for another self-mobile printer 20 to reach the user or to transfer the print job to the multifunction device 30 are displayed.

If the answer from the client device 10 received in step S426 in response to the query message sent in step S425 indicates that the user has selected "robot", the server device 40 instructs another self-mobile printer 20 to take over the print job to perform printing in step S427. If the answer from the client device 10 indicates "multifunction device", the server device 40 instructs the multifunction device 30 to take over the print job to perform printing in step S428.

As in the processing shown in FIG. 25, the processing shown in FIG. 28 is executed without considering whether it is the large self-mobile printer 20A or a small self-mobile printer 20B that has been blocked on its way to a user. However, the server device 40 may perform control, depending on whether it is the large self-mobile printer 20A or a small self-mobile printer 20B that has been blocked on its way to the user. If the large self-mobile printer 20A has been blocked, the number of remaining pages that have not been printed is checked. If the server device 40 determines that the burden on a small self-mobile printer 20B is too heavy if the small self-mobile printer 20B takes over the job, it checks whether or not two small self-mobile printers 20B are available. If two small self-mobile printers 20B are available, the server device 40 may distribute the print job over the two small self-mobile printers 20B. Alternatively, by sending a query message similar to that sent in step S426, the server device 40 may recommend that the user select the multifunction device 30 to take over the job. Alternatively, the server device 40 may simply instruct the multifunction device 30 to take over the job without asking the user, by sending a message that the multifunction device 30 will take over the job to the client device 10.

(Authentication Acting by Self-Mobile Printer for Multifunction Device)

Figure 31:
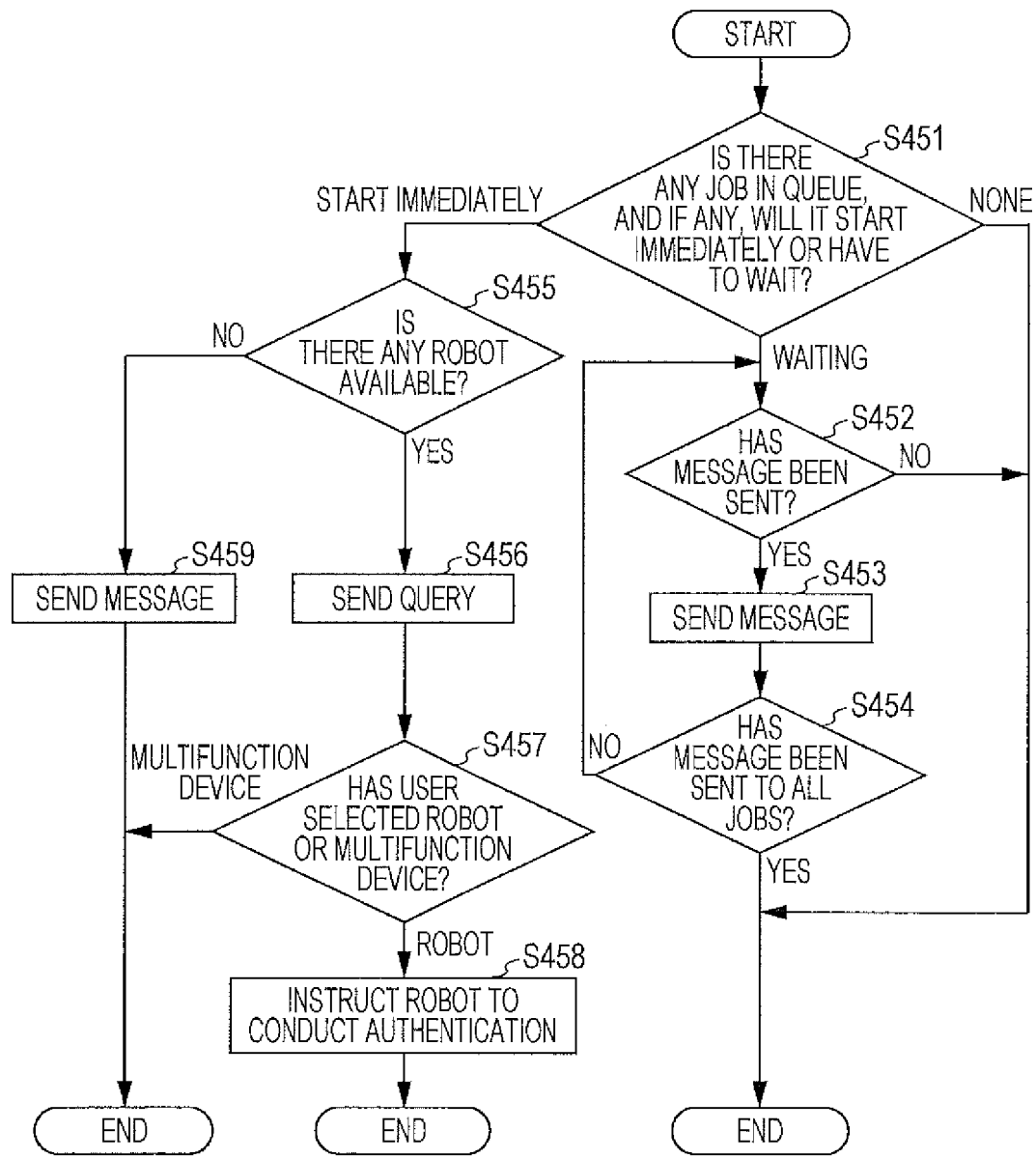
FIG. 31 is a flowchart illustrating processing executed by the server device when checking the progress of processing executed by the multifunction device.

FIG. 31 is a flowchart illustrating processing executed by the server device 40 when checking the progress of processing executed by the multifunction device 30. The processing shown in FIG. 31 is repeatedly executed at short intervals, for example, every ten seconds.

In step S451, the server device 40 first checks the queue of the multifunction device 30 to find out whether or not there is a job that will start immediately (within a predetermined threshold time). If there is neither of a job in execution nor jobs in the queue, or if there is no job in the queue other than a job in execution, the processing is terminated.

If it is found in step S451 that although there is a job in the queue, this job will start much later (in a time greater than the predetermined threshold time) since another job is in execution, it is checked in step S452 whether or not the message shown in FIG. 32 has already been sent. If the message has not been sent, in step S453, the message shown in FIG. 32 is sent to the client device 10 which has sent the job.

It is then checked in, step S454 whether or not all the jobs in the queue are subjected to steps S452 and S453. In other words, steps S452 and S453 are repeated for each of the jobs in the queue.

Figure 32:
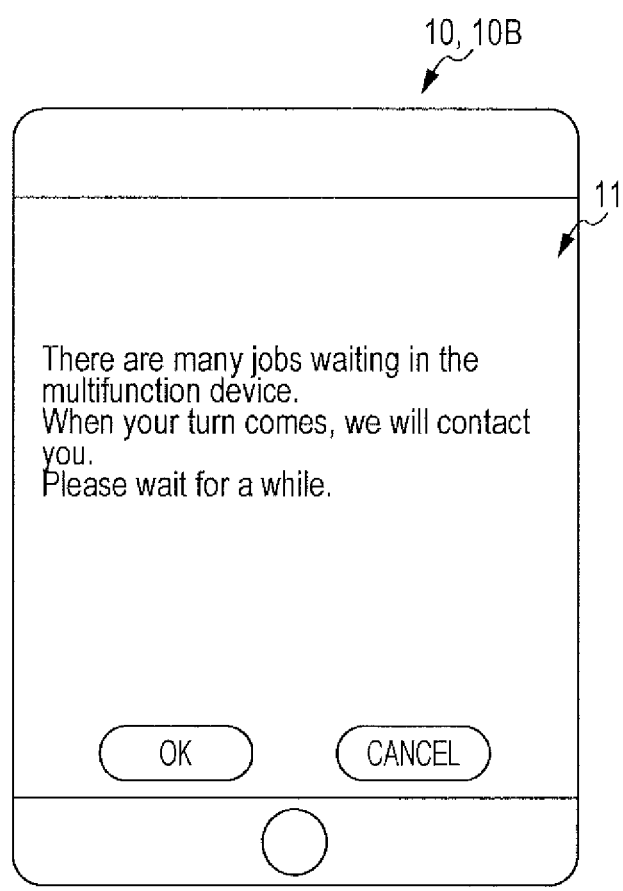
FIG. 32 illustrates a message screen displayed on a display screen of a client device which receives a message in the processing in FIG. 31.

FIG. 32 illustrates a message screen displayed on the display screen 11 of the client device 10 which has received the message in step S453.

On this message screen, a message that there are many jobs waiting in the multifunction device 30 and it will take a while before the user's turn comes is displayed.

If it is found in step S451 that there is a job in the queue that will start immediately (within the predetermined threshold time), it is checked in step S455 whether or not there is a self-mobile printer 20 in the standby state. If there is a self-mobile printer 20 in the standby state, in step S456, the server device 40 sends the query message shown in FIG. 33 to the client device 10 which has sent the print job to be executed in the multifunction device 30.

Figure 33:
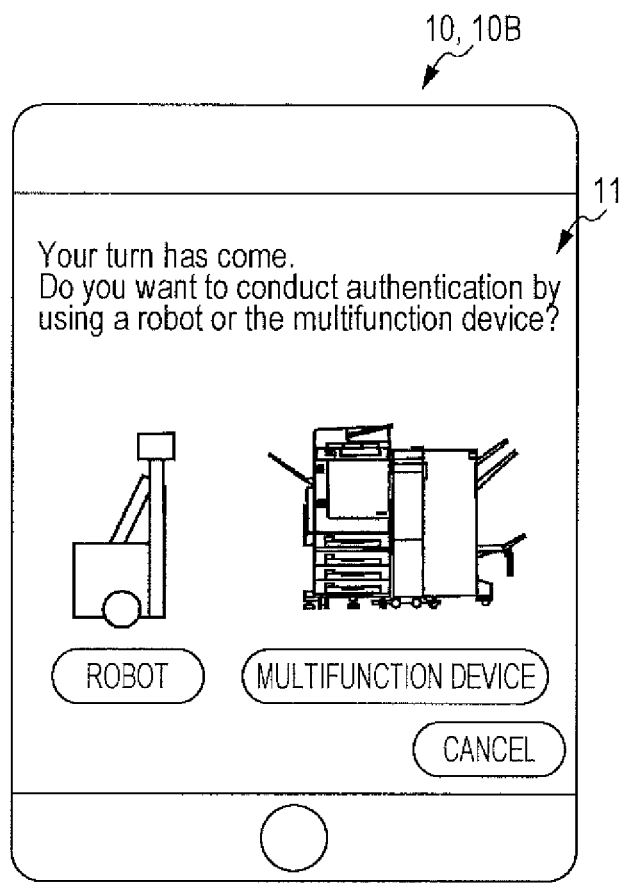
FIG. 33 illustrates a query message screen displayed on a display screen of a client device which receives a query message in the processing in FIG. 31.

FIG. 33 illustrates a message screen displayed on the display screen 11 of the client device 10 which has received the query message in step S456.

On this message screen, a message that the user's turn has arrived and a query about whether the user would like to conduct authentication by using the self-mobile printer 20 or the multifunction device 30 are displayed.

If the answer from the client device 10 received in step S457 in response to the query message sent in step S456 indicates that the user has selected "robot", the server device 40 instructs the self-mobile printer 20 in the standby state to go to the user and to conduct authentication for the multifunction device 30 in step S458. If the answer from the client device 10 indicates that the user has selected "multifunction device", the server device 40 terminates this processing.

Figure 34:
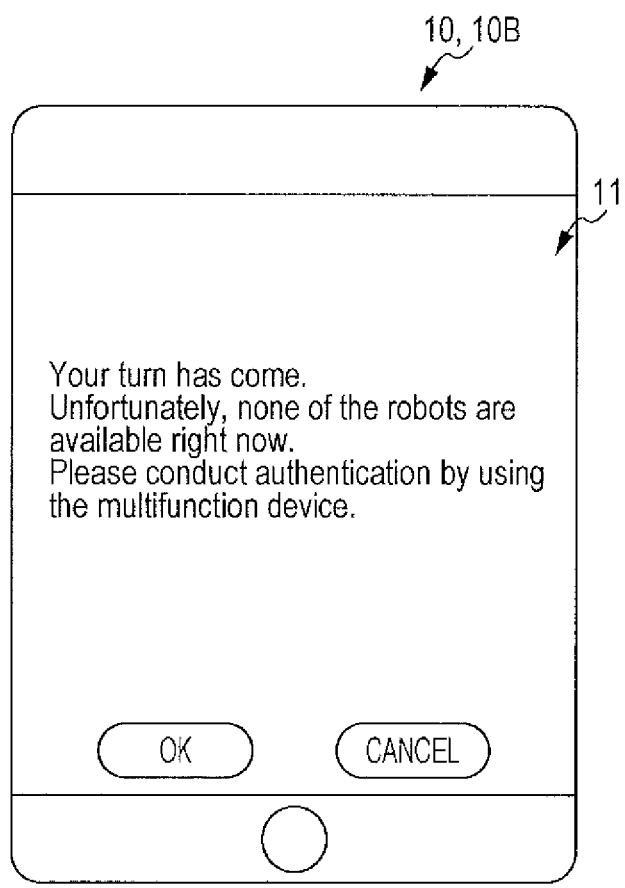
FIG. 34 illustrates a message screen displayed on a display screen of a client device which receives a message in the processing in FIG. 31.

If it is found in step S455 that there is no self-mobile printer 20 in the standby state, the server device 40 sends the message shown in FIG. 34 to the client device 10 in step S459, and then terminates the processing.

FIG. 34 illustrates a message screen displayed on the display screen 11 of the client device 10 which has received the message in step S459.

On this message screen, a message that the user's turn has arrived and there is no self-mobile printer 20 available for conducting authentication. Upon receiving this message, the user of the client device 10 goes to the multifunction device 30 and conducts authentication.

As a result of the self-mobile printer 20 conducting authentication in response to the instruction received in step S458, if authentication has succeeded, the self-mobile printer 20 reports the success of authentication to the server device 40.

Figure 35:
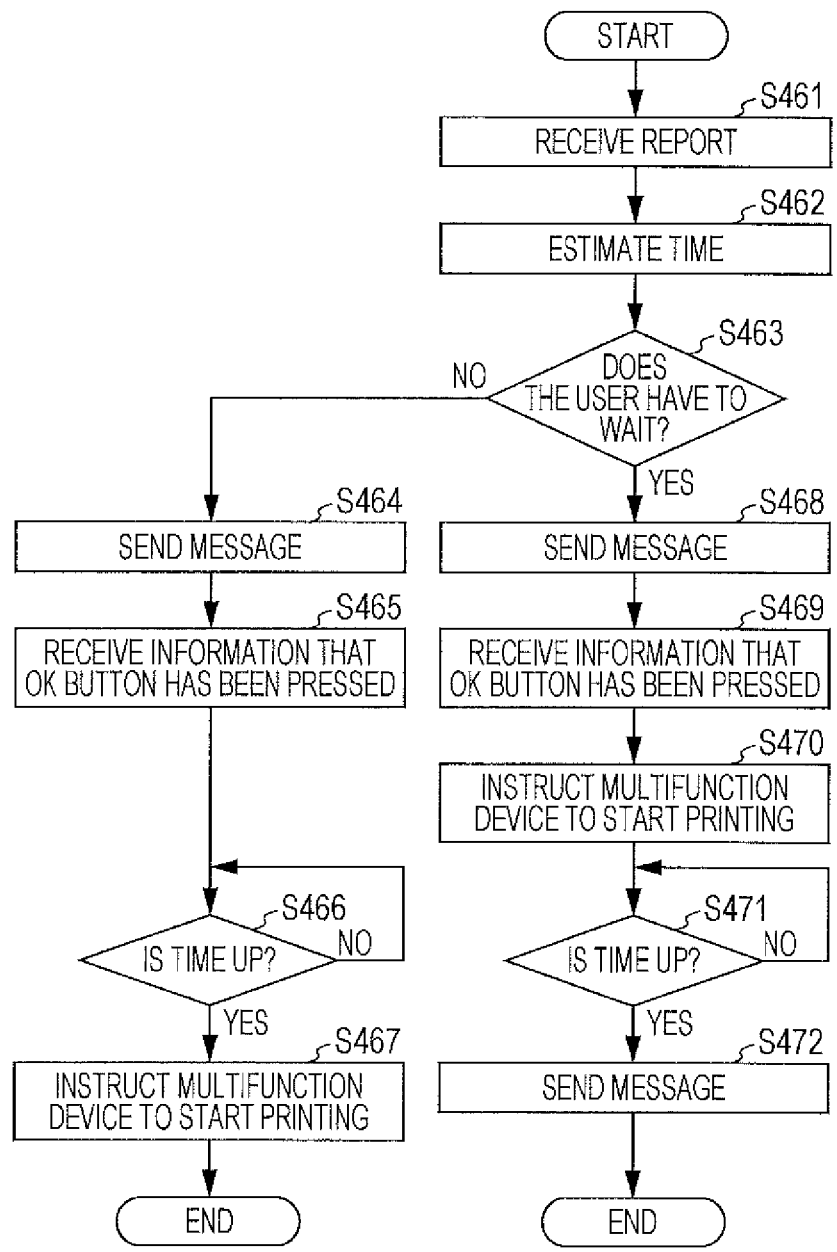
FIG. 35 is a flowchart illustrating processing executed by the server device when receiving a report indicating the success of authentication from a self-mobile printer.

FIG. 35 is a flowchart illustrating processing executed by the server device 40 when receiving a report from a self-mobile printer 20 that authentication has succeeded.

In step S461, the server device 40 receives a report from a self-mobile printer 20 that authentication for a print job on behalf of the multifunction device 30 has succeeded. Then, in step S462, the server device 40 estimates the time to be taken before the print job can start. This job may require a considerably long time to make preparations for printing, such as the conversion of image data. The time estimated in step S462 is a time required for making preparations.

It is then checked in step S463 whether or not printing can immediately start without requiring a long time for making preparations. If it will not take time to make preparations, the server device 40 sends the message shown in FIG. 36 to the client device 10 in step S464.

Figure 36:
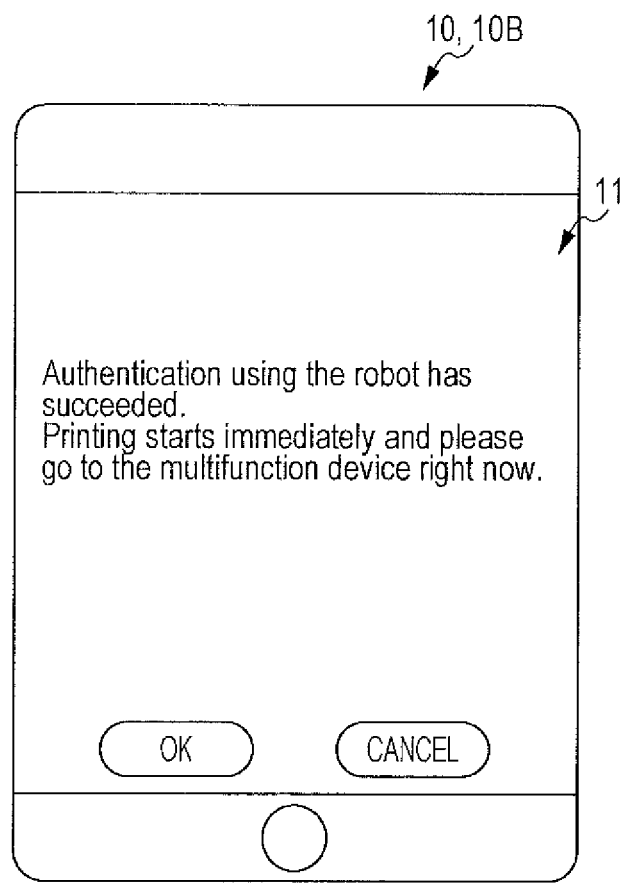
FIG. 36 illustrates a message screen displayed on a display screen of a client device which receives a message in the processing in FIG. 35.

FIG. 36 illustrates a message screen displayed on the display screen 11 of the client device 10 which has received the message in step S464.

On this message screen, a message that authentication using the self-mobile printer 20 has succeeded and printing will start immediately and an instruction for the user to go to the multifunction device 30 immediately are displayed. However, at this time point, printing does not start yet in the multifunction device 30.

Upon receiving information that the OK button has been pressed on the message screen shown in FIG. 36 in step S465, the server device 40 starts a timer and checks whether the time is up in step S466. If the time is up, the server device 40 instructs the multifunction device 30 to start printing in step S467. The reason why the server device 40 starts the timer after receiving information that the OK button has been pressed is that the server device 40 is required to measure the time elapses from the time point when the user has recognized that the user has to go to the multifunction device 30 immediately. The reason why printing does not start until the time is up in the timer is that it is necessary to secure the time for the user to go to the multifunction device 30. In other words, if printing starts before the user reaches the multifunction device 30, the execution of authentication is meaningless and security problems may arise. The time to be set in the timer in step S465 may be different depending on the distance between the user's seat and the installation place of the multifunction device 30.

Figure 37:
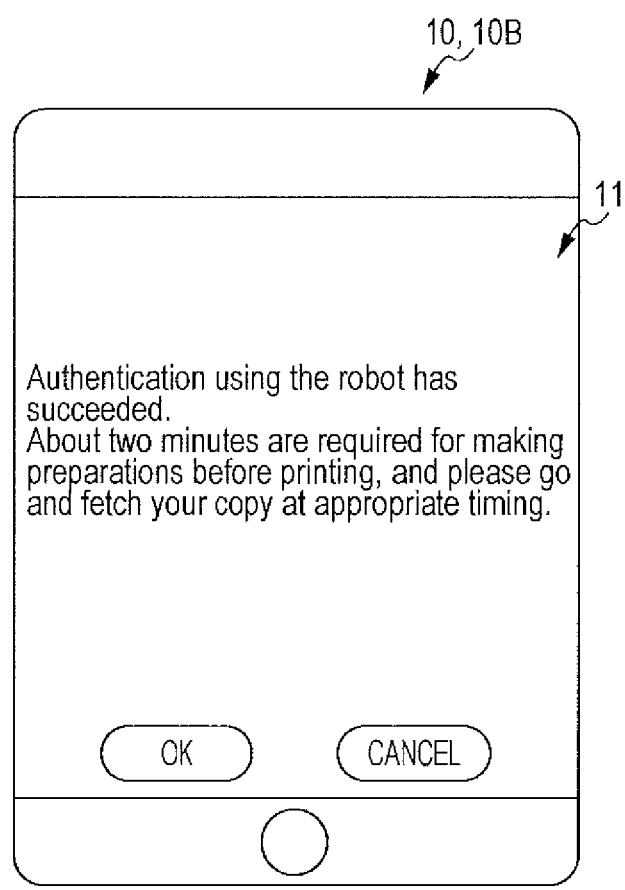
FIG. 37 illustrates a message screen displayed on a display screen of a client device which receives a message in the processing in FIG. 35.

If it is found in step S463 that it will take time to make preparations for printing, the server device 40 sends the message shown in FIG. 37 to the client device 10 in step S468.

FIG. 37 illustrates a message screen displayed on the display screen 11 of the client device 10 which has received the message in step S468.

On this message screen, a message that the authentication using the self-mobile printer 20 has succeeded and the estimated time required to make preparations for printing are displayed.

Upon receiving information that the OK button has been pressed on the message screen shown in FIG. 37 in step S469, the server device 40 instructs the multifunction device 30 to start printing in step S470. Upon receiving this instruction, the multifunction device 30 starts to make preparations for printing.

The server device 40 starts a timer and checks whether the time is up in step S471. If the time is up, the server device 40 sends a message to the client device 10 again in step S472. The server device 40 starts the timer to measure the time ((the time required for making preparations for printing)−(the time required for the user to go to the multifunction device 30)). With this time given, printing does not start before the user reaches the multifunction device 30, and printing starts immediately after the user reaches the multifunction device 30.

Figure 38:
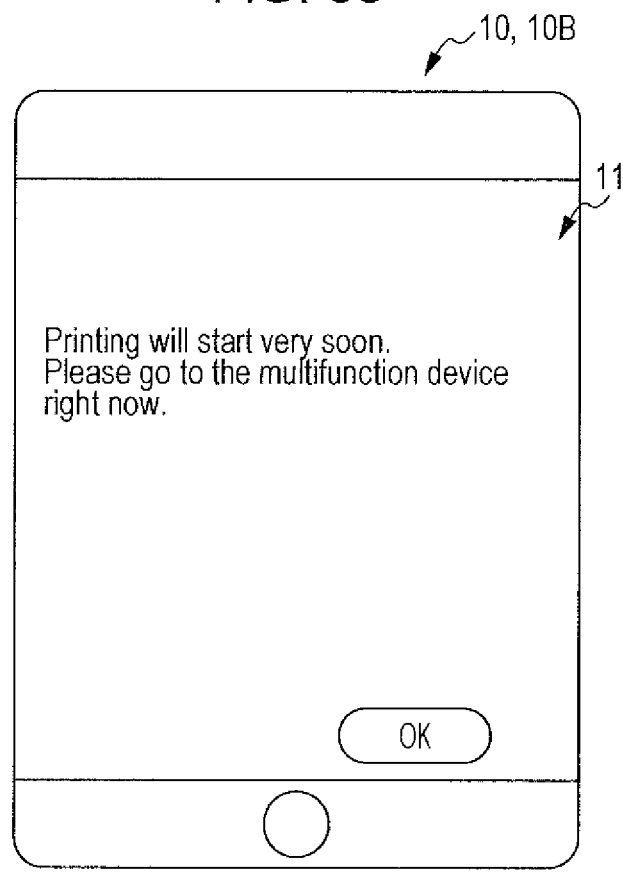
FIG. 38 illustrates a message screen displayed on a display screen of a client device which receives a message in the processing in FIG. 35.

FIG. 38 illustrates a message screen displayed on the display screen 11 of the client device 10 which has received the message in step S472.

On this message screen, a message that the preparations for printing will finish very soon and printing will start soon is displayed. This message is displayed in step S472 at a time before printing actually starts by the amount of time required for the user to reach the multifunction device 30. If printing starts before the user reaches the multifunction device 30, security problems may arise. Upon receiving the message shown in FIG. 38, the user starts to go to the multifunction device 30 immediately.

In the print system 100 of this exemplary embodiment, the self-mobile printer 20 conducts authentication on behalf of the multifunction device 30. With this configuration, the user does not have to wait for a long time at the multifunction device 30, thereby enhancing user convenience.

(Logout)

Figure 39:
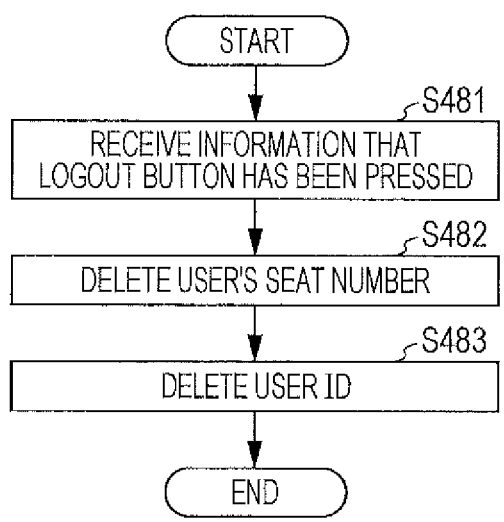
FIG. 39 is a flowchart illustrating processing executed by the server device when performing a logout operation.

FIG. 39 is a flowchart illustrating processing executed by the server device 40 when performing a logout operation.

Figure 40:
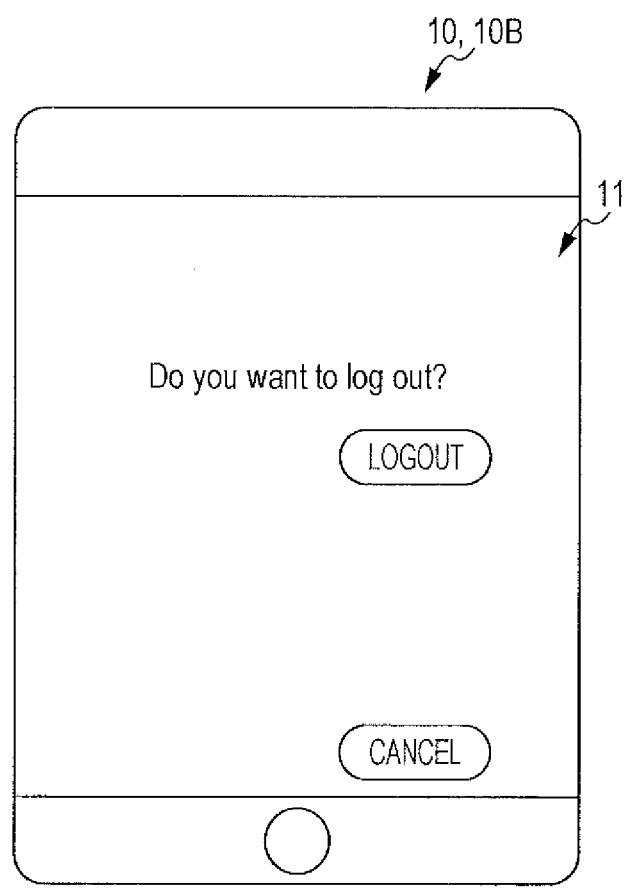
FIG. 40 illustrates a logout screen displayed on a display screen of a client device.

FIG. 40 illustrates a logout screen displayed on the display screen 11 of the client device 10.

When the user finishes work in the office 60 (see FIG. 2) on that day, the user performs the logout operation by using the client device 10. The user first starts the logout screen shown in FIG. 40 and presses the logout button on the logout screen.

In step S481, the server device 40 receives information that the logout button has been pressed. Then, the server device 40 deletes the user's seat number in step S482, and deletes the user ID assigned to the user when entering the office 60 in step S483. After finishing the logout operation, the user returns the IC card at the reception and leaves the office 60.

In the print system 100 of this exemplary embodiment, the self-mobile printers 20 work together and the self-mobile printers 20 and the multifunction device 30 also work together in various manners. It is thus possible to improve user services and to implement the efficient operation of the self-mobile printers 20.

(Others)

In the print system 100 of this exemplary embodiment, print services are provided at the user's seat unless a print job is transferred to the multifunction device 30, and at the time when the user sends a print instruction, the self-mobile printer 20 starts to move to the user's seat. Alternatively, the user may specify a location where printing is performed (for example, a meeting table or a meeting room). The user may also specify the time at which printing is performed.

In the print system 100 of this exemplary embodiment, the user receives an IC card having a user ID recorded thereon which is valid only on that day when entering the office 60, and returns this IC card when leaving the office 60. However, for a user authorized to use the office 60, an IC card having a unique user ID may be given to the user, and the user may keep this IC card even after leaving the office 60.

In this case, in terms of enhancing the security, when the server device 40 receives a print instruction from a client device 10, it may send a one-time password which is valid for only one transaction (printing) to the client device 10, and may instruct the client device 10 to input this one-time password when conducting authentication before performing printing. Alternatively, biometric information concerning the user, such as the face and fingerprint, may be registered, and user authentication may be conducted by using the biometric information.

In this exemplary embodiment, the print system 100 shown in FIG. 1 includes the server device 40. However, the present invention may be applicable to a system without the server device 40 in which client devices 10, a self-mobile printer 20, and a multifunction device 30 directly communicate with each other and to a system without the server device 40 in which client devices 10 and plural self-mobile printers 20 directly communicate with each other. In this case, in addition to the above-described functions of the self-mobile printer 20 and the multifunction device 30, the functions of the server device 40 may be provided to the self-mobile printer 20 or the multifunction device 30. In the system including plural self-mobile printers 20, the functions of the server device 40 may be provided to one of the self-mobile printers 20 or may be distributed over the plural self-mobile printers 20. As the system without the server device 40, a small print system including only two printers, such as two self-mobile printers 20 or one self-mobile printer 20 and a multifunction device 30, is suitably used. It is obvious that the print system 100 of the above-described exemplary embodiment is easily modified into a system without the server device 40. Thus, an explanation of such a system will be omitted here.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print system comprising:
   a client device that issues a print instruction in accordance with a user operation;
   a plurality of mobile printers that each receive a print instruction and move to a destination indicated by the print instruction so as to perform printing at the destination; and
   a server device that selects a mobile printer which will perform printing based on a print instruction issued by the client device, in accordance with selection standards including judgement standards for judging whether or not it is necessary to distribute a print instruction over a plurality of mobile printers or to transfer a print instruction from one mobile printer to another mobile printer.

2. The print system according to claim 1, wherein the judgement standards include a judgement standard for judging whether or not a first event has occurred, the first event is an event in which a time required for performing printing based on a print instruction is estimated to exceed a predetermined time and in which there are a plurality of mobile printers in a standby state, and upon the occurrence of the first event, the server device distributes a print instruction over a plurality of mobile printers.

3. The print system according to claim 1, wherein:
   the mobile printer selected by the server device informs the server device of the occurrence of a first situation, the first situation being a situation where the mobile printer is unable to continue to perform printing based on the print instruction, and also informs the server device of the progress of the execution of the print instruction; and
   the judgement standards include a judgement standard for judging whether or not a second event has occurred, the second event is an event in which information indicating the occurrence of the first situation is received from a first mobile printer to which the server device has provided a print instruction, and upon the occurrence of the second event, the server device instructs a second mobile printer to take over the print instruction executed by the first mobile printer.

4. The print system according to claim 1, wherein:
   each of the plurality of mobile printers is a printer which is capable of moving by itself by judging whether or not the mobile printer is able to pass through a space on the way to a destination, and a mobile printer which has received a print instruction informs the server device of the occurrence of a second situation, the second situation being a situation where the mobile printer is unable to pass through a space on the way to a destination indicated by the print instruction; and
   the judgement standards include a judgement standard for judging whether or not a third event has occurred, the third event is an event in which information indicating the occurrence of the second situation is received from a first mobile printer to which the server device has provided a print instruction, and upon the occurrence of the third event, the server device cancels the print instruction provided to the first mobile printer and instructs a second mobile printer to execute the print instruction.

5. A print system comprising:
   a client device that issues a print instruction in accordance with a user operation;
   a mobile printer that receives a print instruction and moves to a destination indicated by the print instruction so as to perform printing at the destination;
   a stationary printer that is installed at a fixed position and that receives a print instruction and performs printing; and
   a server device that assigns a print instruction issued by the client device to the mobile printer or the stationary printer in accordance with an assigning standard for assigning a print instruction, wherein
   when issuing a print instruction, the client device is able to specify which one of the mobile printer and the stationary printer will perform printing in accordance with a user operation, and
   if a specified one of the mobile printer and the stationary printer by the client device is inconsistent with a selected one of the mobile printer and the stationary printer by using the assigning standard, the server device informs the client device that the specified one of the mobile printer and the stationary printer by the client device is inconsistent with the selected one of the mobile printer and the stationary printer by using the assigning standard.

6. The print system according to claim 5, wherein:

the assigning standard includes a first standard which is required to conform and a second standard which is desirable to conform;

if the specified one of the mobile printer and the stationary printer by the client device is inconsistent with a selected one of the mobile printer and the stationary printer by using the first standard, the server device informs the client device that the specified one of the mobile printer and the stationary printer by the client device is inconsistent with the selected one of the mobile printer and the stationary printer by using the first standard, and assigns the print instruction to one of the mobile printer and the stationary printer selected by using the first standard; and if the specified one of the mobile printer and the stationary printer by the client device is inconsistent with a selected one of the mobile printer and the stationary printer by using the second standard, the server device informs the client device that the specified one of the mobile printer and the stationary printer by the client device is inconsistent with the selected one of the mobile printer and the stationary printer by using the second standard and asks the client device about whether or not the client device agrees to assign one of the mobile printer and the stationary printer selected by using the second standard, and upon receiving a response indicating that the client device agrees to assign one of the mobile printer and the stationary printer selected by using the second standard, the server device assigns the print instruction to one of the mobile printer and the stationary printer selected by using the second standard.

7. A print system comprising:

a mobile printer that receives a print instruction, moves to a destination indicated by the print instruction, conducts user authentication, and then performs printing at the destination; and a stationary printer that is installed at a fixed position and that receives a print instruction, conducts user authentication, and then performs printing, wherein the mobile printer conducts user authentication on behalf of the stationary printer before the stationary printer performs printing.

* * * * *